US006842175B1

(12) United States Patent
Schmalstieg et al.

(10) Patent No.: US 6,842,175 B1
(45) Date of Patent: Jan. 11, 2005

(54) TOOLS FOR INTERACTING WITH VIRTUAL ENVIRONMENTS

(75) Inventors: Dieter Schmalstieg, Vienna (AT); Oliver Bimber, Providence, RI (US); L. Miguel Encarnacão, Warwick, RI (US)

(73) Assignee: Fraunhofer USA, Inc., Plymouth, MI (US)

( * ) Notice: Subject to any disclaimer, the term of this patent is extended or adjusted under 35 U.S.C. 154(b) by 0 days.

(21) Appl. No.: 09/959,087

(22) PCT Filed: Dec. 7, 1999

(86) PCT No.: PCT/US99/28930

§ 371 (c)(1),
(2), (4) Date: Oct. 16, 2001

(87) PCT Pub. No.: WO00/65461

PCT Pub. Date: Nov. 2, 2000

Related U.S. Application Data

(60) Provisional application No. 60/153,567, filed on Sep. 13, 1999, provisional application No. 60/137,007, filed on Jun. 1, 1999, and provisional application No. 60/130,590, filed on Apr. 22, 1999.

(51) Int. Cl.[7] .............................................. G06T 15/00
(52) U.S. Cl. ..................................................... 345/427
(58) Field of Search ............................... 345/418, 419, 345/426, 427, 428, 619

(56) References Cited

U.S. PATENT DOCUMENTS

| | | | | |
|---|---|---|---|---|
| 6,084,557 A | * | 7/2000 | Ishida et al. | 345/9 |
| 6,084,594 A | * | 7/2000 | Goto | 345/427 |
| 6,354,838 B1 | * | 3/2002 | Tagge et al. | 434/62 |
| 6,549,200 B1 | * | 4/2003 | Mortlock et al. | 345/419 |

OTHER PUBLICATIONS

Frohlich, *Erstellen von Produktionsmodellen und Produktionsplanung auf der Respnsive Workbench* (using the responsive workbench to make production models and do production planning), Congress 98 Program, 1998.

Stork, Maidhof,*Efficient and Precise Solid Modelling using a 3D Input Device*, Solid Modeling, 1997, pp. 181–194.

Chu, Dani and Gadh, *Multi–sensory user interface for a virtual–reality–based computer–aided design system*, Computer–Aided Design, vol. 29, No. 10, Mar. 20, 1997, pp. 709–725.

Mine, *Working in a Virtual World: Interaction Techniques Used in the Chapel Hill Immersive Modeling Program*, Aug. 1, 1996, pp. 1–14.

Stoakley, Conway, Pausch, *Virtual Reality on a WI: Interactive Worlds in Miniature*, 1995, pp. 265–272.

Liang and Green, *JDCAD: A Highly Interactive 3D Modeling System*, Modelling, Rendering and Animation Techniques, pp. 499–502, 1994.

Butterworth, Davidson, Hench, and Olano, *3DM: A Three Dimensional Model Using a Head–Mounted Display*, 1992, pp. 135–138.

(List continued on next page.)

Primary Examiner—Phu K. Nguyen
(74) Attorney, Agent, or Firm—Gordon E. Nelson

(57) ABSTRACT

The tools include components which are images produced by the system (103) that creates the virtual environment in response to inputs specifying the tool's location and the point of view of the tool's user. One class of the tools includes transparent components (121, 123); the image component of the tool is produced at a location in the virtual environment determined by the transparent component's location and the point of view of the tool's user. Tools in this class include a transparent pad (121) and a transparent stylus (123). The transparent pad (121) has an image component that may be used as a palette, as a magic lens, and as a device for selecting and transporting components of the virtual environment or even a portion of the virtual environment itself.

64 Claims, 21 Drawing Sheets

OTHER PUBLICATIONS

Szalavari and Gervautz, *The Personal Interaction Panel—a Two–Handed Interface for Augmented Reality*, The Eurographics Association, 1997.

Sachs, Roberts, and Stoops, *3–Draw: A Tool for Designing 3D Shapes*, IEEE Computer Graphics & Applications, 1991, pp. 18–26.

Angus and Sowizral, *Embedding the 2D Interaction Metaphor in a Real 3D Virtual Environment*, in the Proceedings of IS&T/SPIE's Electronic Imaging Symposium, 1995.

Shaw, Green, *Two–Handed Polygonal Surface Design*, Association of Computing Machinery, 1994, pp. 205–212.

Zeleznick, Herndon, Hughes, *Sketch: An Interface for Sketching 3D Scenes*, Association of Computing Machinery, 1996, pp. 163–170.

Forsberg, LaViola, Jr., and Zeleznik, *Seamless Interaction in Virtual Reality*, Projects in VR, 1997, pp. 6–9.

\* cited by examiner

| | Gesture | × | ∿∿ | ◯ | ╱ | |
|---|---|---|---|---|---|---|
| 1603 Object control | Resulting operation | delete | undo | select | deselect | |

| | Gesture | + | 〰 | ▢ | < | ∧ |
|---|---|---|---|---|---|---|
| 1605 Mode change | Resulting mode | Context-sensitive menu | Coloring mode | Window tools | Fish net selection | Object creation |

TOOLS FOR INTERACTING WITH VIRTUAL ENVIRONMENTS

CROSS REFERENCES TO RELATED APPLICATIONS

This patent application claims priority from U.S. Provisional Application No. 60/130,590, L. Miguel Encarnação et al., Transparent props for interaction with immersive projection technology, filed Apr. 22, 1999, from U.S. Provisional Application No. 60/137,007, Oliver Bimber, Using reflective props with back-screen projection planes, filed Jun. 1, 1999, and from U.S. provisional Application No. 60/153,567, L. Miguel Encarnação, et al., Tools for interacting with virtual environments, filed Sep. 13, 1999.

BACKGROUND OF THE INVENTION

1. Field of the Invention

The invention relates generally to tools by means of which users of an interactive environment may interact with the environment and more specifically to tools for interactively manipulating objects belonging to a virtual environment.

2. Description of Related Art

With the continuing increase in processor power and memory density and decrease in the cost of processors and displays, virtual reality systems, in which computers are used to generate displays that appear to the user to be three-dimensional, have become more than laboratory curiosities. Such displays are termed in the following virtual environments. A natural area of application for virtual environments would seem to be design: most objects are three-dimensional, and a computer-aided design (CAD) system that creates a virtual environment should be able not only to provide the designer with a three-dimensional representation of the object being designed, but should also be able to permit the designer to interact directly with the virtual environment in much the same fashion as a two-dimensional CAD system permits the designer to directly interact with its two dimensional display.

One approach to using virtual environments in CAD systems has been the virtual table, a workbench-like back-projection system. Stereoscopic rendering allows representations of objects being worked on by the designer to appear as if they were floating in space above the table, permitting the designer to grab them, move them, and otherwise manipulate them in the virtual reality produced by the table. The virtual table seems perfectly suited as a virtual environment for interactive product design. The designer can either start with 2D sketches on the tabletop and then successively extrude them into 3D space or work directly in 3D from the beginning. The mere size of the table allows for intuitive, gesture-based interaction of the user's hand in the space above the virtual environment that appears on the tabletop. Thus, the virtual table—as an interactive media—combines the strengths of conventional drawing boards, current CAD systems and interactive virtual environments; hence, the virtual table has the potential to make the CAD workplace into a 3D workspace.

Unfortunately, in most interactive virtual reality systems, the user interacts with the virtual environment by means of obtrusive devices such as data gloves and tethered tracking systems. Current examples of user interfaces for interacting with virtual environments include the following: Chu et al. are working on a multi-modal VR-CAD system. See C.-C. P Chu, et al., "Multi-sensory user-interface for a virtual-reality-based computer-aided design system", *Computer-Aided Design*, vol. 29, no. 10., pp. 709–725, 1997. This application can be used at a virtual table driven by data gloves. Forsberg et al. have extended their SKETCH system towards 3D and use two magnetic trackers at a virtual table for object transformation with the non-dominant hand and 3D sketching with the dominant hand. See R C. Zeleznik, K. P. Herndon and J. F. Hughes. "SKETCH: An Interface for Sketching 3D Scenes", *Computer Graphics (Siggraph'96 Proceedings)*, pages 163–170, August 1996, and A. Forsberg, J. LaViola, L. Markosian, R Zeleznik. "Seamless Interaction in Virtual Reality", *IEEE Computer Graphics and Applications*, 17(6):6–9, November/December 1997. Fröhlich et al. at Stanford University have developed an architectural application that has assembly/disassembly features and snapping capabilities, as presented in B. Fröhlich, and M. Fischer: "Erstellen von Produktionsmodellen und Produktionsplanung auf der Responsive Workbench". *Wirtschaftsfaktor Virtual Reality: Planen, Bauen und Marketing mit VR*, Congress 98, ARCiTEC, Graz, Austria, Mar. 5–6, 1998, CD-ROM Proceedings. URL: http://www-graphics.stanford.edu/projects/RWB/roof/. These research efforts show that there is a trend from using a virtual table as a presentation device towards exploiting it for interactive and collaborative applications. See for example L. D. Cutler, B. Fröhlich, and P. Hanrahan: Two-Handed Direct Manipulation on the Responsive Workbench, 1997 Symposium on Interactive 3D Graphics, pp. 107–114, ACM Press, 1997

Butterworth's 3DM (J. Butterworth, A. Davidson, S. Hench, and T. M. Olano: 3DM—A three dimensional modeler using a head-mounted display. *Communications of the ACM*, 1992, pp. 55–62.) was one of the first modeling tools using virtual reality technology. The CRIMP system from the University of North Carolina is also an immersive modeling system. It is presented in M. R. Mine. "Working in a virtual world: interaction techniques used in the Chapel Hill immersive modelling program". *Technical Report* 1996-029, 1996. 3-Draw by Sachs, Roberts and Stoops (E. Sachs, A. Roberts, and D. Stoops. "3-Draw: A tool for designing 3D shapes". *IEEE Computer Graphics and Applications*, pages 18–25, Nov. 1991) allows creation of 3D line sketches in a two-handed fashion by drawing lines with a pen on a tablet while moving the tablet through space. Liang and Green used a flying 3D device in their highly interactive modeler JDCAD, discussed in J. D. Liang and M. Green. "JDCAD: A highly interactive 3D modelling system". *Computers and Graphics*, 18(4), pages 499–506, 1994. THRED (C. Shaw and M. Green: "Two-Handed Polygonal Surface Design", UIST 94, pp. 205–213, ACM Press, 1994) is a tool for two-handed polygonal surface modeling. Stork and Maidhof introduced 3D interaction techniques for modeling precisely with 3D input devices. See A. Stork and M. Maidhof "Efficient and Precise Solid Modelling Using 3D input Devices". *Proceedings of ACM Symposium on Solid Modelling and Applications*, pp. 181–194, May 14–16, Atlanta, Ga., 1997.

In spite of all this research, virtual tables and other virtual reality systems are typically used only for design review, apparently because the techniques used to interact with the virtual environment are non-intuitive, difficult to learn, and incompatible with standard ways of doing design work.

The most promising techniques for overcoming these interface difficulties involve the use of pen and pad interfaces. These interfaces consist of an opaque planar surface (the pad) that is held in the subordinate hand and a pointing device (typically a pen) that is held in the dominant hand. The virtual reality system projects images on the pad's surface and the pen is used to manipulate the images and thereby to manipulate the virtual environment A paper by Stoakley, et al, "Virtual Reality on a WIM: Interactive Worlds in Miniature", CHI '95 *Mosaic of Creativity*, Denver, Colo., 1995, pp. 265–272, describes the use of a pad to display a miniature representation of the virtual environment By turning the pad, the user can look at the miniature representation from a point of view different from that from which the user is looking at the full-sized virtual environment. The user can also us a pointing device to select and manipulate items on either the miniature representation or the full-sized virtual environment, with manipulations in the one being reflected in the other. If the user's position in the full-sized virtual environment is recorded on the miniature representation, the miniature representation serves as a map. Finally, the miniature representation may work as a "magic lens" to show aspects of the virtual environment that are not visible in the full-sized version.

Angus, et al., disclose the use of a virtual tool called a paddle to interact with a virtual environment in their paper, Ian G. Angus, et al. "Embedding the 2D Interaction Metaphor in a Real 3D Virtual Environment, Proceedings of IS&T/SPIE's Electronic Imaging Symposium, 1995. The paddle is hand-held and has three real buttons. The virtual environment knows the position of the paddle and of a pointing device, and projects 2-D representations onto the paddle's opaque surface. The user can then employ the buttons and the pointing device to interact with the display on the paddle. One use of the paddle is to give the user of the virtual environment a 2-D map of the environment with the user's current position in the environment marked on the map. The user employs the map to locate him or herself within the virtual environment and to navigate to other locations in the environment.

Zsolt Szalavári and Michael Gervautz' paper, "The Personal Interaction Panel—a Two Handed Interface for Augmented Reality", *Eurographics '97*, the Eurographics Association, vol. 16, No.3, discloses an opaque pad and pen where the pad is used as a display and the pen is used to select items on the pad and in the virtual environment. When the pen is used to select an item in the virtual environment, the item appears on the pad. The manner in which it is selected by the pen determines how it appears on the pad. The items on the pad may include objects to be added to the virtual environment and tools for manipulating objects in the environment. To add an object on the pad to the environment, the user employs the pen to drag the object from the pad to the desired position in the environment. To employ a tool on the virtual pad, the user employs the pen to select the object and then employs the pen to operate the tool. Among the tools disclosed are scaling tools, rotation tools, cut and paste tools, magic lenses, and coloring tools.

As promising as the pen and pad interfaces are, they still have a number of difficulties and limitations. These difficulties and limitations stem in large part from the fact that the pad and pen are not really part of the virtual environment:

a separate projection arrangement is necessary to project images onto the pad;

the pad and pen obscure the parts of the virtual environment that are behind them;

because the pad is opaque, it has been generally used only to control or display information about the virtual environment, not to interact directly with it. Thus, the most typical use of an opaque pad is as an analogue to a menu or dialog box in a two-dimensional GUI.

What is needed in general is tools for working with virtual environments that are themselves part of the virtual environment. In the particular area of pad and pen tools, what is needed is tools where the pad and pen are part of the virtual environment, where they do not obscure the virtual environment, and therefore are easily implemented in an environment such as a virtual table which only employs back projection to create the virtual environment.

Further needs in working with virtual environments are techniques for indirectly viewing portions of the virtual environment that are not otherwise accessible and techniques for using objects created by the virtual environment in conjunction with real objects.

SUMMARY OF THE INVENTION

The invention provides tools for working with the virtual environment that are themselves part of the virtual environment. The user employs a device to view a portion of the virtual environment and the virtual environment system responds to the position and orientation of the device and the direction and point of view of the user by producing a modification of the portion as required for the tool.

In one aspect of, the invention, the device is a mirror and the virtual environment system responds to the mirror's position and orientation and the given direction and point of view by modifying the portion of the virtual environment that is reflected in the mirror. The reflected portion may be modified to show the virtual environment as it would be seen from the direction and point of view that is the reflection of the given direction and point of view in the mirror, so that it appears to the viewer in the same fashion as a real environment seen through a mirror. The reflected portion may also be used as a "Magic lens" to show a different view of the virtual environment, for example, an X-ray view. What is seen may further depend on which side of the mirror is being used. Ray tools may be used with the mirror by simply pointing the ray tool at the desired point in the reflection in the mirror.

In another aspect of the invention, the device is transflective, that is, the user can simultaneously see objects through the device and objects reflected on the device. The objects seen through the device belong to a physical space and the objects reflected on the device belong to a reflection space. Given the location and orientation of the device, the direction and point of view of the user's eyes, and a location in the physical space, the virtual environment system can define the reflection space so that it exactly overlaps the physical space and can define a portion of the virtual environment so that the reflection of the portion in the device appears at the given location in the physical space. The technique can be used to deal with occlusion of the virtual environment by a real object or to augment a real object with objects created by the virtual environment.

In still another aspect of the invention, the device may simply be a handle. The virtual environment system uses the given direction and point of view and the device position and orientation to determine where the image of a tool controlled by the handle appears in the virtual environment. The handle may be attached to a transparent component such as a transparent tube or a transparent panel. The extent of the tool's image is determined by the extent of the transparent component and to the user, the transparent component and the tool's image appear to merge, that is, the tool appears to be whatever the portion of the virtual environment that the user sees through the transparent component shows. Thus, for example, a transparent tube may appear in the virtual environment as a stylus, a net, a trowel, a knife, or a saw and may be used to perform corresponding operations on the virtual environment. The transparent panel similarly merges with whatever the portion of the virtual environment viewed through the panel shows, and may therefore be as polymorphic as the transparent tube. The device may have two or more sides, with the modification of the portion depending on which side is used to view the virtual environment Useful modifications include ones in which the portion of the virtual environment is modified to appear as though it were viewed through a transparent panel, ones in which the portion is modified to function as a "magic lens", and ones where a "snapshot" can be made of the portion and the device used to move the "snapshot" to another part of the virtual environment.

The portion can also be used to select an object in the virtual environment, either by being moved over the object or by sweeping through the volume of the virtual environment occupied by the object. The portion may also be context sensitive in that its appearance changes in response to the selection of a particular object.

The portion may further include one or more objects that move with the portion, and the device may be used with a selection device. The objects that move with the portion may include objects to be placed in the virtual environment or objects that have been taken from the virtual environment and placed in the portion. The objects that move with the portion may further include representations of operations to be performed on selected objects of the virtual environment. Examples of such representations are buttons and sliders. Among the operations is changing the manner in which the virtual environment system modifies the portion. The portion thus functions as a tool palette for working with the virtual environment. The tool palette is context sensitive in that the representations depend on the mode of operation of the portion and the object being operated on.

The selection device may be transparent and the virtual environment system may use the position and orientation of the selection device and the given direction and point of view to produce an image of the selection device in the portion. The image may contain a visual representation of the operation presently being performed using the selection device.

The selection device may be a stylus and the device itself may be a transparent panel. In such an embodiment, the virtual environment system may respond to movements of an end of the stylus on or near the transparent panel by making corresponding marks in the portion of the virtual environment. The virtual environment system may further include a gesture manager which interprets the movements of the end of the stylus as gestures indicating objects, operations, or letters and/or numbers.

The device that is used to view the portion of the virtual environment may operate in either the reflective or transparent modes just described, with the mode of operation being determined by the orientation of the device relative to the virtual environment.

The device that is used to view the portion may be fixed or movable relative to the virtual environment, as may be the given direction and point of view. Where both are movable, the given direction and point of view may be those of the eyes of a user of the virtual environment system and the device may be held in the user's hand. Modes of operation of the device may depend on the position of the device relative to the virtual environment or on separate mode inputs.

Other objects and advantages will be apparent to those skilled in the arts to which the invention pertains upon perusal of the following Detailed Description and drawing, wherein:

BRIEF DESCRIPTION OF THE DRAWING

FIG. 16 shows the gestures used to control objects and change modes in a preferred embodiment;

Figure 1:
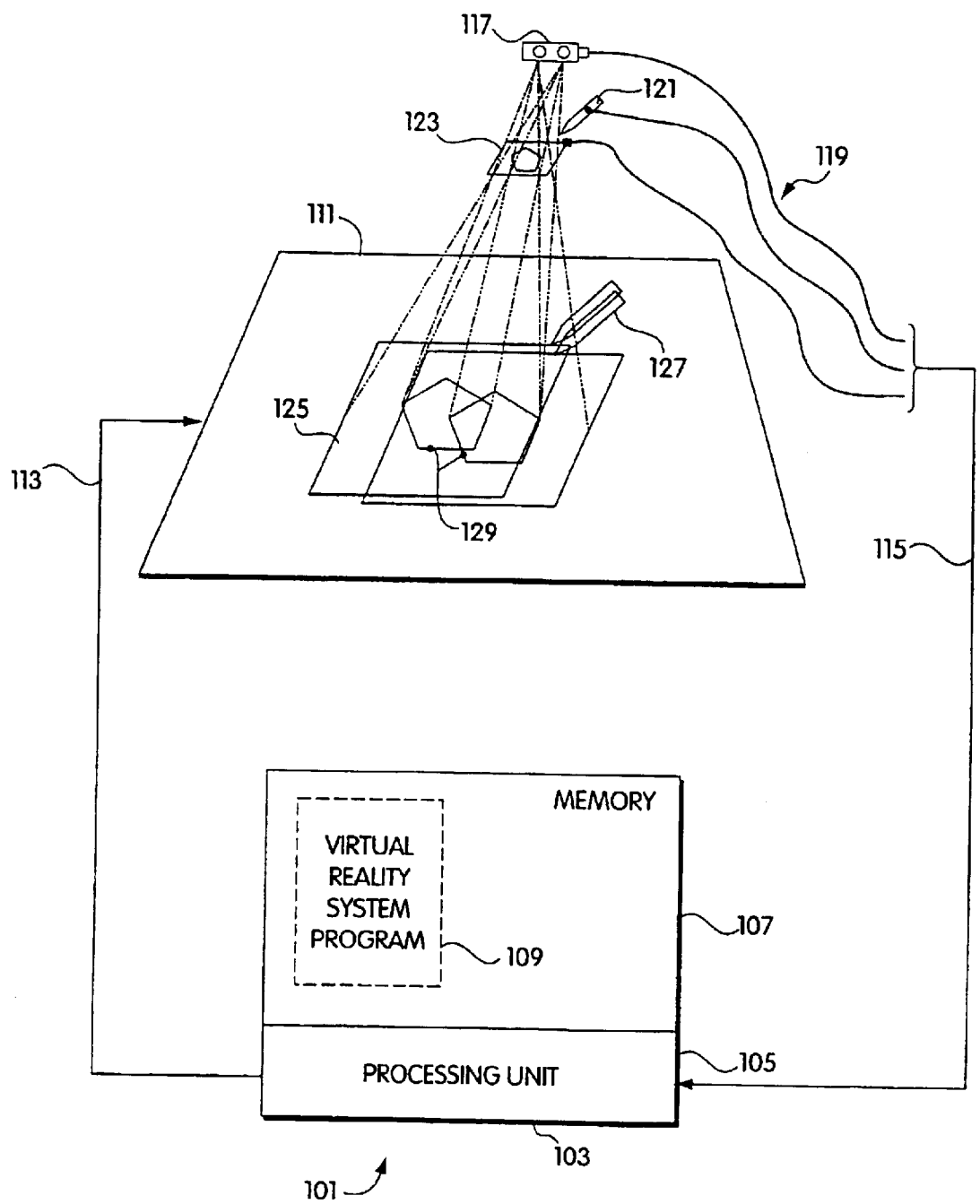
FIG. 1 is an overview of an implementation of the invention in a virtual table.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following description will begin with an overview of a pad and pen interface for interacting with a virtual environment that utilizes a transparent pad, will continue with a description of a virtual table in which the invention has been implemented, and will then describe a number of ways in which the transparent pad and pen interface may be used in a virtual environment.

Overview of the Pad and Pen Interface: FIG. 1

The pad and pen interface of the invention employs a transparent pad and a large, pen-shaped plastic tube that functions as a pen and is further equipped with a button that is used in the same fashion as a mouse button to activate an object selected by the pen. The interface is used with a virtual table, but can be advantageously employed in any virtual reality system that uses back projection to create at least part of the virtual environment. FIG. 1 shows a system 101 for creating a virtual environment on a virtual table 111 in which the pad and pen interface of the invention is employed. Processor 103 is executing a virtual reality system program 109 that creates stereoscopic images of a virtual environment. The stereoscopic images are back-projected onto virtual table 111. As is typical of such systems, a user of virtual table 111 views the images through LCD shutter glasses 117. When so viewed, the images appear to the user as a three-dimensional virtual environment. Shutter glasses 121 have a magnetic tracker attached to them which tracks the postion and orientation of the shutter glasses, and by that means, the postion and orientation of the user's eyes. Any other kind of 6DOF tracker could be used as well. The postition and orientation are input (115) to processing unit 105 and virtual reality system program 109 uses the position and orientation information to determine the point of view and viewing direction from which the user is viewing the virtual environment. It then uses the point of view and viewing direction to produce stereoscopic images of the virtual reality that show the virtual reality as it would be seen from the point of view and viewing direction indicated by the position and orientation information.

When the transparent pad and pen are being used with virtual table 111, the user holds transparent pad 123 in the subordinate hand and pen 121 in the dominant hand. Both pad 123 and pen 121 have magnetic trackers 119, and position and orientation information from pad 123 and pen 121 are provided to processing unit 105 along with the position and orientation information from shutter glasses 121. Virtual reality system program 109 knows the actual sizes of transparent pad 123 and pen 121, and uses that information, together with the position and orientation information, to generate stereoscopic images 125 of pad 123 and stereoscopic images 127 of pen 121 and back project them onto the surface of virtual table 111 at locations such that they cover the same portions of the surface of virtual table 111 that pad 123 and pen 121 appear to the user to cover.

Projected image 125 of transparent pad 123 may be transparent, or it may function as a "magic lens" to show a view of the virtual environment that is different from what is seen outside the area of projected image 125. Projected image 125 may further appear to carry tools and objects that can be used in manipulating the virtual environment. Projected image 127 of pen 121 will further include a cursor at the pen's point. When the user looks at projected pad 125 through transparent pad 123, projected object 129 appears to be on transparent pad 123, and when real pen 121 is touching transparent pad 123, projected pen image 127 appears to be touching projected pad 125. By moving real pen 121 on transparent pad 123, the user can thus touch and manipulate projected object 129 on projected pad 125. It is important to understand at this juncture that the images of pad 125, object 129, and pen 127 are not projected onto transparent pad 123 itself, but rather projected onto the surface of virtual table 111 and viewed through transparent pad 121, which is nothing more than a sheet of Plexiglas® acrylic plastic with an attached 6DOF tracker 119. In the preferred embodiment, tracker 119 is magnetic. Similarly, pen image 127 is viewed through pen 121, which is in fact nothing but a transparent plastic tube with a button.

The effect of this arrangement is to incorporate objects into the virtual environment which the user can manipulate and use in a fashion which is analogous to the way that a user manipulates r, and uses a clipboard and pen when dealing with actual reality. System 101 thus unifies several previously isolated approaches to 3D user-interface design, such as two-handed interaction and the use of multiple coordinate systems. Our interface supports the following important features:

- two-handed interaction
- multi-purpose physical props
- embedding 2D in 3D
- use of multiple coordinate systems (i.e., of the table and the pad)
- transparent tools, especially window-tools and through-the-plane tools.

In a preferred embodiment, it is pad image 125 which takes on many forms; the image 127 of tube 121 remains always a pen. Image 127 can, however, be just as polymorphic as pad image 125: it can be the image of a pen, the image of a paint brush, the image of a net with a handle, and so on and so forth.

Indeed, since the user is viewing the images, rather than the transparent tube or the transparent pad, both pad 123 and pen 121 can be reduced to handles: system 101 uses the position and orientation information from the handle and from shutter glasses 117 together with parameters about the size and type of tool to make an image of the tool at the proper position in the virtual environment. The handles are hidden by the user's hand and consequently need not be transparent. The handles could also have forms corresponding to the forms of the handles with real tools. For instance, the handle for a tool in the virtual environment whose real-world equivalent is two-handed can be two-handed. The advantage of using a real transparent pen and a real transparent panel instead of just handles is, of course, that the real transparent pen and panel are as polymorphic as handles by themselves, but also provide the user with tactile feedback.

Details of a Preferred Embodiment of the Transparent Pad and Pen Interface

Hardware

A preferred embodiment of system 101 uses the Baron Virtual Table produced by the Barco Group as its display device. This device offers a 53"×40" display screen built into a table surface. The display is produced by a Indigo2™ Maximum Impact workstation manufactured by Silicon Graphics, Incorporated. When the display is viewed through CrystalEyes® shutter glasses from StereoGraphics Corporation, the result is a virtual environment of very high brightness and contrast. In the preferred embodiment, transparent pad 123 is an 8"×10" Plexiglas® acrylic plastic sheet and pen 121 is a large, transparent, pen-shaped plastic tube with a button. Both props and the shutter glasses in the preferred embodiment are equipped with 6DOF (six degrees of freedom) Flock of Birds® trackers made by Ascension Technology Corporation, for position and orientation tracking.

The material for the pen and pad was also selected for minimal reflectivity, so that with dimmed light—the usual setup for working with the virtual table—the props become almost invisible. While they retain their tactile property, in the user's perception they are replaced by the projected pad 125 and projected pen 127 produced by the virtual table. Our observations and informal user studies indicate that virtual objects can even appear floating above pad 123's surface, and that conflicting depth cues resulting from such scenarios are not perceived as disturbing. Conflicts occur only if virtual objects protrude from the outline of the prop as seen by the user because of the depth discontinuity. The most severe problem is occlusion from the user's hands. Graphical elements on pad 123 are placed in a way so that such occlusions are minimized, but they can never be completely avoided.

The pen was chosen to be relatively large to provide room for graphics displayed inside the pen. In that way, the pen also provides visual feedback by e.g., displaying the tool it is currently associated with. So far, however, we have made only basic use of this capability and have instead focused on the pad as a carrier for the user interface.

Software

Software architecture: In the preferred embodiment, virtual reality system program 109 is based on the Studierstube software framework described in D. Schmalstieg, A. Fuhrmann, Z. Szalavári, M. Gervautz: "Studierstube"—An Environment for Collaboration in Augmented Reality. Extended abstract appeared Proc. of Collaborative Virtual Environments '96, Nottingham, UK, Sep. 19–20, 1996. Full paper in: Virtual Reality–Systems, Development and Applications, Vol. 3, No. 1, pp. 3749, 1998. Studierstube is realized as a collection of C++ classes that extend the Open Inventor toolkit, described at P. Strauss and R. Carey: An Object Oriented 3D Graphics Toolkit. Proceedings of SIGGRAPH'92, (2):341-347, 1992. Open Inventor's rich graphical environment approach allows rapid prototyping of new interaction styles, typically in the form of Open Inventor node kits. Tracker data is delivered to the application via an engine class, which forks a lightweight thread to decouple graphics and I/O. Off-axis stereo rendering on the VT is performed by a special custom viewer class. Studierstube extends Open Inventor's event system to process 3D (i.e., true 6DOF) events, which is necessary for choreographing complex 3D interactions like the ones described in this paper. The iv file format, which includes our custom classes, allows convenient scripting of most of an application's properties, in particular the scene's geometry. Consequently very little application-specific C++ code—mostly in the form of event callbacks—was necessary.

Calibration. Any system using augmented props requires careful calibration of the trackers to achieve sufficiently precise alignment of real and virtual world, so the user's illusion of augmentation is not destroyed. With the VT this is especially problematic, as it contains metallic parts that interfere with the magnetic field measured by the trackers. To address this problem, we have adopted an approach similar to the one described in M. Agrawala, A. Beers, B. Fröhlich, P. Hanrahan, I. McDowall, M. Bolas: The Two-User Responsive Workbench: Support for Collaboration Through Individual Views of a Shared Space. Proceedings of SIGGRAPH, 1997, and in W. Krüger, C. Bohn, B. Fröhlich, H. Schüth, W. Strauss, and G. Wesche: The Responsive Workbench: A Virtual Work Environment IEEE Computer, 28(7):42–48, 1995. The space above the table is digitized using the tracker as a probe, with a wooden frame as a reference for correct real-world coordinates. The function represented by the set of samples is then numerically inverted and used at run-time as a look-up table to correct for systematic errors in the measurements.

Window tools: The rendering of window tools generally follows the method proposed in J. Viega, M. Conway, G. Williams, and R Pausch: 3D Magic Lenses. In Proceedings of ACM UIST'96, pages 51–58. ACM, 1996, except that it uses hardware stencil planes. After a preparation step, rendering of the world "behind the window" is performed inside the stencil mask created in the previous step, with a clipping plane coincident with the window polygon. Before rendering of the remaining scene proceeds, the window polygon is rendered again, but only the Z-buffer is modified. This step prevents geometric primitives of the remaining scene from protruding into the window. For a more detailed explanation, see D. Schmalstieg, G. Schaufler: Sewing Virtual Worlds Together With SEAMS: A Mechanism to Construct Large Scale Virtual Environments. Technical Report TR-186-2-87-11, Vienna University of Technology, 1998.

Ways of Using the Transparent Pad and Pen to Interact with a Virtual Environment A way of using user interface props to interact with a virtual environment is termed in the following a metaphor. For example, one such metaphor is the palette: projected pad 125 carries tools and controls that the user can employ to interact with the virtual environment. Among the metaphors for which the transparent pad and pen can be employed are the following:

embedding 2-D images in the 3-D virtual environment;

Tool and object palette: The pad can carry tools and controls, much like a dialog box works in the desktop world. This way it can serve as carrier of 3D user-interface elements (widgets) and for 3D menu selection. Furthermore, it can offer collections of 3D objects to choose from, parameter fields to edit, or additional information to be displayed in a hand-held private view. Because the pad is transparent, it works as a see-through tool. For example, a context-sensitive menu can be displayed on the pad image that adapts itself to the objects that the user currently is viewing through the pad. This allows a reduction of the complexity of the 2D interface at any point in time, thus allowing for the display of more data that is specific to what is being viewed through the pad.

Window tools: the pad image defines a "window" into the virtual reality. The window can be used in a number of ways:

1. Through-the-plane tool: When the window is used as a through-the-plane tool, the user orients the "window" defined by the pad image and then manipulates objects seen through the window by applying the pen to the pad. Objects can e.g., be selected by using the pen to make a circle on the pad around the object as seen through the pad. The circle appears on the pad image and the circled object is selected.

2. Lens and mirror tools: The window defined by the pad image can be used as a "magic lens" to see things that the user otherwise cannot see in the virtual environment, for example to obtain an "X-ray" view of an object in the virtual embodiment. The pad can also be used as a mirror to reflect a view of the back side of an object in the virtual environment. These functions can be combined, so that for example, what is seen in the mirror is an X-ray view of the back side of an object.

Volumetric manipulation tool: The pad itself can be used for active object manipulation, exploiting the fact that the pad has a spatial extent (unlike the point represented by the pen tip). For example, reference planes and axes can be specified with the aid of this tool and sweeps can be interactively defined.

These options co-exist in the design space of our user interface and together form a very powerful and general framework for interaction with a virtual environment. Due to the fact that the physical and geometric properties of the pad are of very basic nature, it is possible to use all the metaphors mentioned above for application tasks without confusing the user. Each of the above metaphors will now be discussed in detail.

Figure 2:
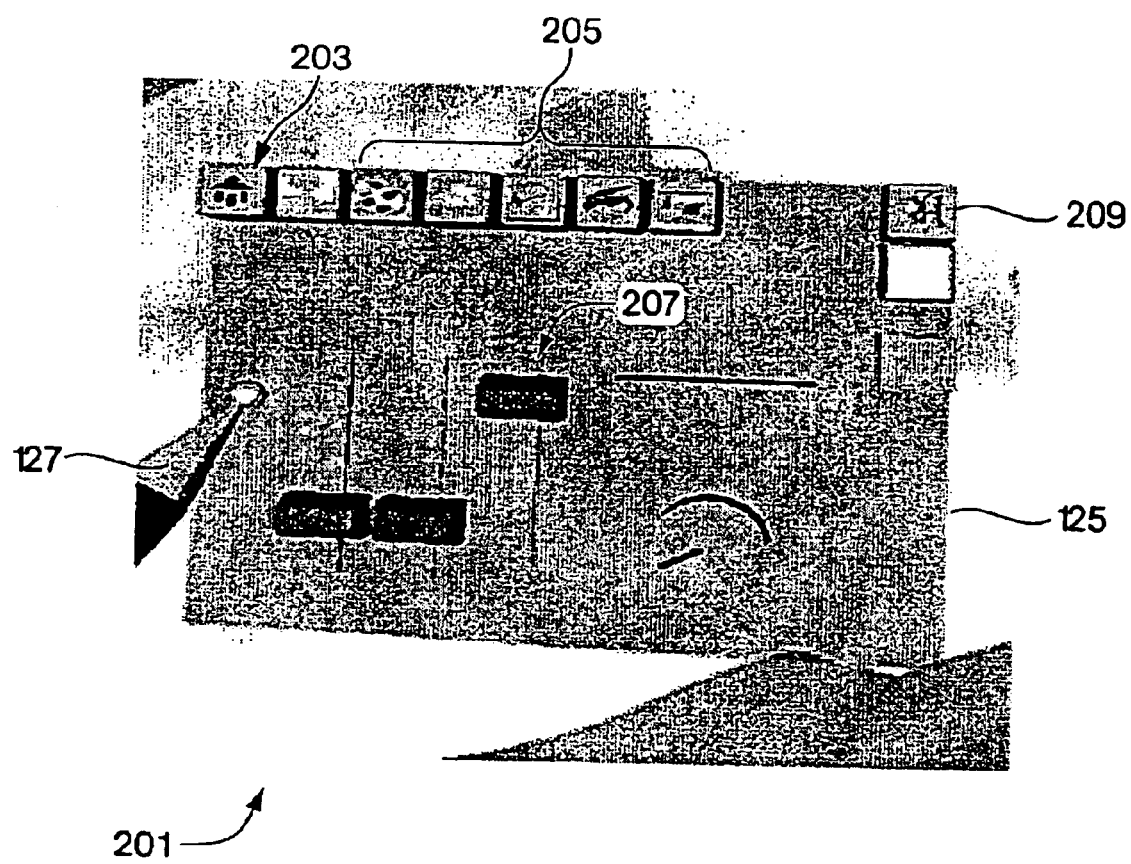
FIG. 2 shows pad image 125 and pen image 127 as they appear when used as a palette tool.

Tool and object palette: FIG. 2

FIG. 2 shows transparent pad image 125 and pen image 127 when the two are being used according to a palette metaphor 201. In this and the following examples, the transparent pad and pen are being used with a virtual reality program that generates a virtual environment for use in large-scale landscaping or town planning. Pad image 125 includes
a set of buttons along the top; included in these buttons are buttons 203 indicating objects such as buildings that can be placed in the virtual environment and buttons 205 indicating tools that can be used to manipulate objects in the virtual environment. Button 209 is an exit button; it is used to exit from the application program being controlled by the transparent pad and pen. To use a tool or select an object on image 125, the user moves pen 121 on pad 123 until the cursor at the tip of pen image is within a button on pad image 125 and then presses the button on pen 121 to select the button on pad image 125. As shown in FIG. 2, a painting tool (indicated by the image of a painter's palette) has been selected and virtual reality program 109 has responded to the selection by making image 125 into a tool for defining a color. It has done this by adding images of sliders 207 to image 125. These sliders control the amount of red, green, and blue in the color being defined, and are manipulated by placing pen 121 in a position on pad 123 such that the cursor on its image 127 touches a slider 207 in image 125 and then moving pen 121 in the direction that the slider 207 is to move. Virtual reality program 109 responds by moving the slider as indicated by pen 121 and changing the color being defined to agree with the movement of the slider.

As can be seen from the foregoing description pad image 125 corresponding to transparent pad 123 resembles the dialog boxes used in desktop system GUIs in that it groups various application controls such as buttons, sliders, dials etc. Since transparent pad 123 is hand-held, it is always in convenient reach for the user, which is an advantage if working on different areas of the table. It is easy to remember where the controls are, and transparent pad 123 can even be put aside temporarily without causing confusion.

The basic mode of our sample landscaping application is object placement. The pad serves as an object browser presenting a collection of objects to select from. The user then moves pen 121 in a fashion such that projected pen 120 appears to drag objects from pad image 125 and drop them into the virtual environment via direct 3D manipulation. Additional controls—some implemented as space-saving pop-up button bar—allow the user to scale, colorize, and delete objects. 2D controls and 3D direct manipulation naturally blend as the pad represents a 2D surface similar to many real-world control containers in other application areas (e.g., a remote control, a radio, a dishwasher's front panel). An important property of image 125 when it is being used according to palette metaphor 201 is that it is context sensitive; it contains only those tools which are relevant to a particular situation in which it is being used. For instance, as will be explained in detail below, tools 205 include a selection tool for selecting an object in the virtual environment, and when an object has been selected, the buttons and tools on image 125 are those that are relevant to that object. Another interesting property is the multiple surfaces of reference with which the user simultaneously interacts. The user can thus select a representation of an object 203 from image 125 and use pen image 127 to drag the representation from pad image 125 to a location in the virtual environment and add it to the virtual environment. We make further use of these multiple surfaces of reference with the window and through-the-plane tools.

Through-the-Plane Tools: FIGS. 3–6

Figure 3:
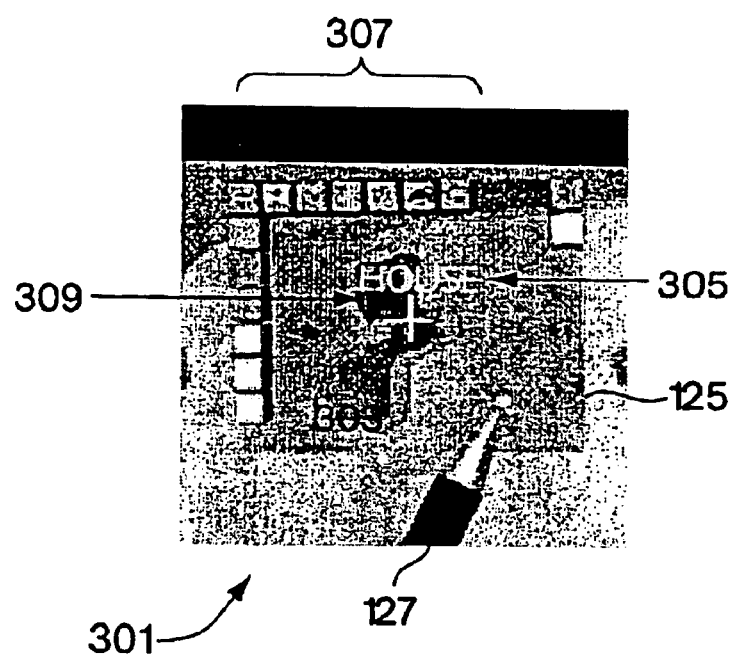
FIG. 3 shows pad image 125 and pen image 127 as they appear when used as a first "through the plane tool"

The fact that pad image 125 may operate in modes in which it is transparent, i.e., the virtual environment may be seen through pad image 125, allows the development of yet another class of user interface tools that we call through-the-plane tools. With these tools, pad image 125 is used to select an object in the virtual environment and the tools that are carried on pad image 125 are used to operate on the selected object In the landscaping application, we have implemented two tools using the pad as an through-the-plane tool. The first tool is a context sensitive information and manipulation dialog, shown in FIG. 3. When pad image 125 is being used as a tool 301, pad image 305 has cross-hairs 303 marking its center. When cross hairs 303 are positioned near an object 309 (here, a house), in the virtual environment, object 309 is selected for manipulation and pad image 125 displays buttons 307 for the tools needed to manipulate object 309, as well as the name of the object at 305. In FIG. 3, the buttons are those needed to colorize the object 309.

Many desktop applications, such as illustration programs, use context-sensitive menus and toolbars that appear and disappear as different objects are selected. The context-sensitive tool brings these possibilities into a virtual reality system. Note that context-sensitive manipulation requires two steps in a one-handed desktop system: The user selects an object, looks for context-sensitive controls to appear somewhere on the screen, and then manipulates the controls. Manipulation of pad and pen can be almost instantaneous and is cognitively more similar to context-sensitive pop-up menus, but without the corresponding disadvantages (e.g., display often obscured by menu, mouse button must be held and cannot be used for interaction).

Figure 4:
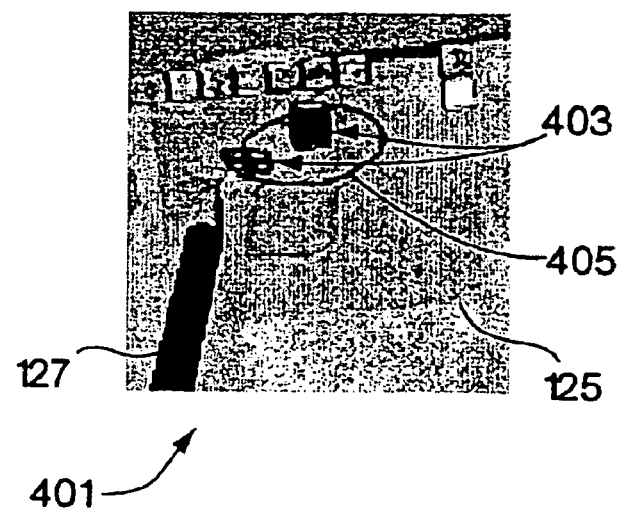
FIG. 4 shows pad image 125 and pen image 127 as they appear when used as a second "through the plane" tool.

Another approach to specifying operations on objects seen through transparent pad image 125 is using pen 121 to write on pad 123, which of course results in projected pen 127 appearing to write on projected pad 125 and marks appearing on projected pad 125. For example, a user may select an object in the virtual environment by using pen 121 to write on pad 123 in such a fashion that projected pen 127 makes marks on projected pad 125 which encircle the object to be selected with a "lasso". This technique is shown in FIG. 4. In metaphor 401, the user has written with pen 121 on pad 123 such that "lasso" 405 appears to encircle objects 403 as seen through pad 405, thereby selecting objects 403. As before, pad image 125 may change upon selection to show those tools appropriate for the selected objects.

Figure 5:
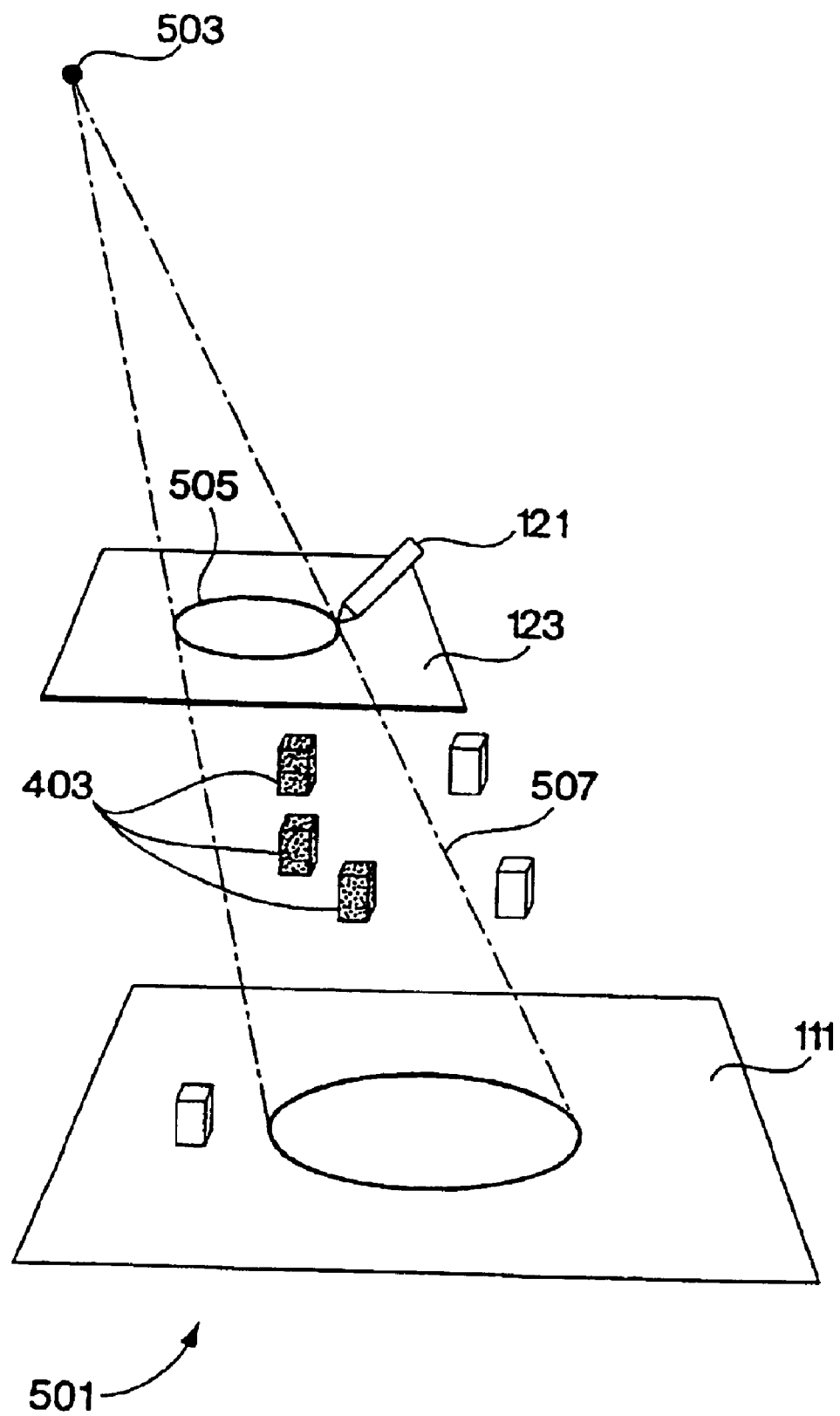
FIG. 5 shows the geometry of object selection in tool 401.

Because of the three-dimensional nature of the virtual environment, an outline drawn on the pad being held into the scene defines a conical sweep volume that has its tip in the user's eye point and its contour defined by the "lasso". All object contained within this volume are selected, as shown in FIG. 5. In geometry 501, the user's eye point 503 and lasso outline 505 that the user draws with pen 121 on pad 123 defines volume 507 in the virtual environment produced by virtual table 111, and volume 507 contains selected objects 403.

Figure 6:
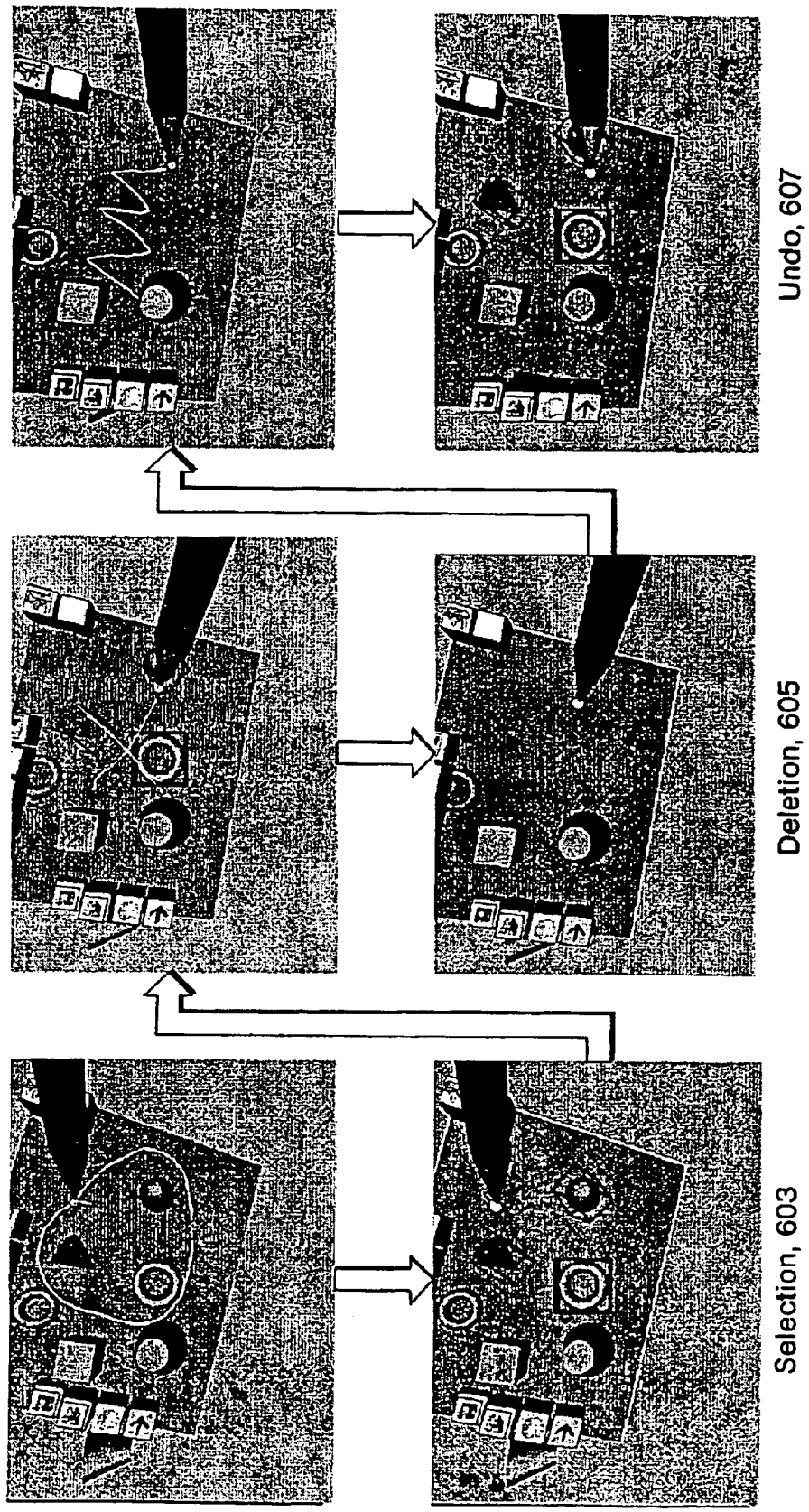
FIG. 6 shows operations performed by means of gestures written on the transparent pad.

Lasso tool 401 is just one example for a wide design space of tools based on 2D gestures that specify operations on the 3D objects of the virtual environment (e.g., objects may be deleted by "sing pen 121 on pad 123 to "cross the objects out" on pad image 125). FIG. 6 shows an example of a sequence of gestures 601 in which objects are selected using a lasso, deleted by crossing them out, and restored by means of an "undo" gesture. The views of pad image 125 and pen image 127 are read as indicated by the arrows. 603 shows how a lasso is used to select a group of objects; 605 shows how a "cross out" gesture is used to delete one of the selected objects; 607, finally, shows how an "undo" gesture is used to restore the deleted object. As will be explained in detail later on, such 2D gestures may be used to create objects, to operate on objects, and to indicate a change in the mode in which pen 121 and pad 123 are operating. Moreover, in a preferred embodiment, a user may teach new gestures to the system.

In general, the through-the-plane tool allows us to reuse all the metaphors that are used in the desktop world to manipulate 2D environments to manipulate virtual environments. It remains to be verified, however, in which cases this 2D manipulation is more capable than direct 3D manipulation. From our observations we conclude that the power of such 2D gesture tools lies in manipulation at-a-distance, for example when attempting to manipulate objects on one side of the table when standing at the other side.

Window Tools: FIGS. 7–11

The through-the-plane tools just described are a special case of tools that involve the window metaphor. When pad 123 is used in this fashion, pad image 125 in the virtual environment defines an area of the virtual environment which has properties that are different from the remainder of the virtual environment. With the through-the-plane tools, pad 123 defines an area in which operations such as selection of objects can be performed. Other examples of window tools are the following:

magic lens tools, which give the user a different view of the virtual environment from that seen outside pad image 125; and snapshot tools, which permit a portion of the virtual environment that is visible through pad image 125 to be captured and moved elsewhere, for example for comparison.

The presently-preferred embodiment employs two examples of magic lens tools: an x-ray vision tool and a mirror tool.

Figure 7:
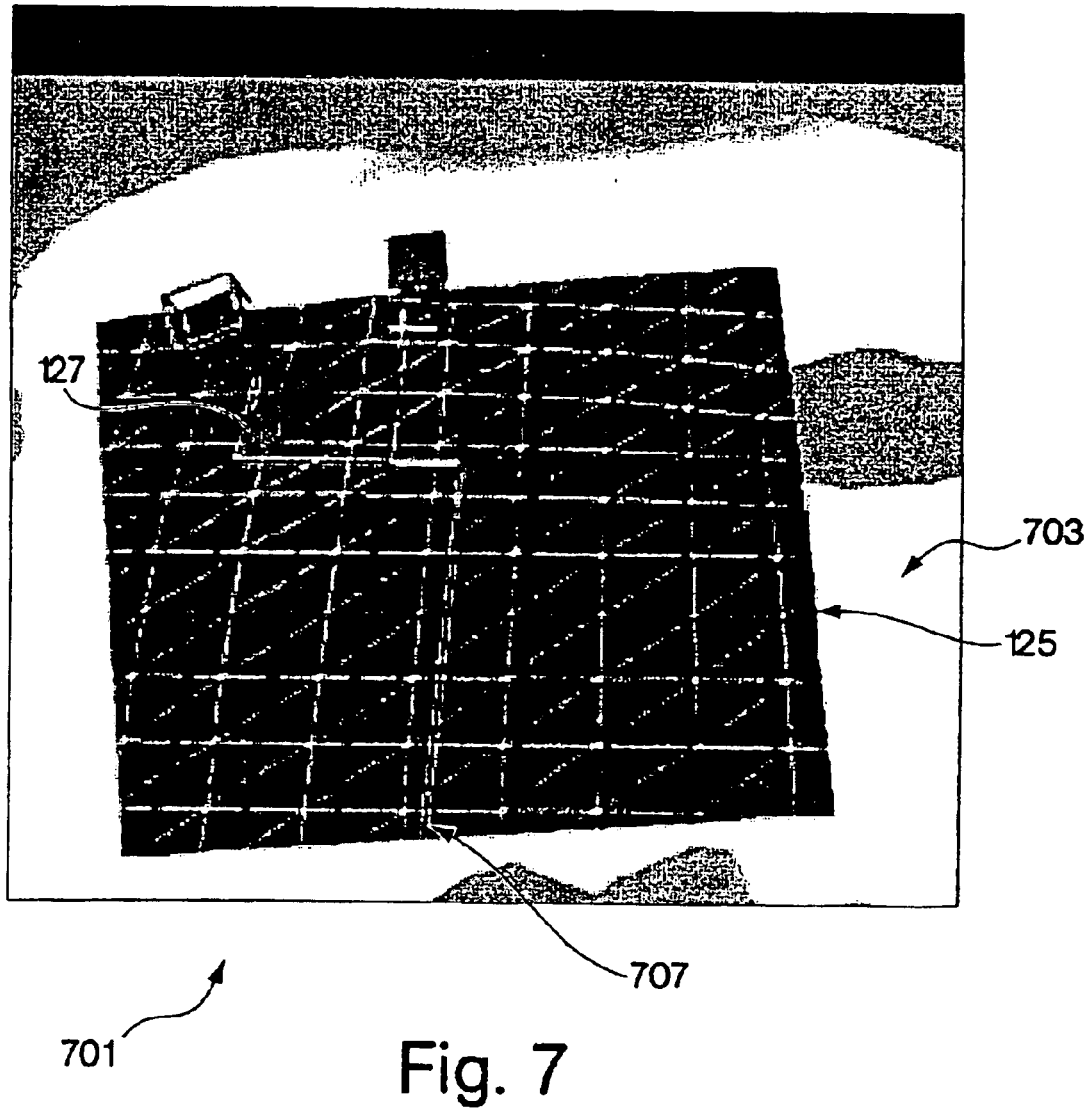
FIG. 7 shows an "x-ray" pad image.

An X-Ray Tool: FIG. 7

One kind of x-ray vision tool is shown in FIG. 7. In the example landscaping application, the area being landscaped has an underground telecommunications network connecting the buildings. To see and modify this network in the virtual environment, the user employs x-ray vision tool 701. As seen in FIG. 7, when pad image 125 is being used as an x-ray vision tool, the area within virtual environment 703 covered by pad image 125 shows the positions of cables 707. Using pen image 127, the user may modify the positions of the cables and connect them to buildings in the virtual environment In the example application, x-ray vision tool 701 is bound to the back side of transparent pad 123, and consequently, to employ x-ray vision tool 701, the user simply turns transparent pad 123 over. The system can easily determine which side of the pad the user is looking at by examining the pad's normal vector. Of course, any tool can be bound to the back side of transparent pad 123, and when properly used, this feature permits transparent pad 123 to be "overloaded" without confusing the user.

Figure 8:
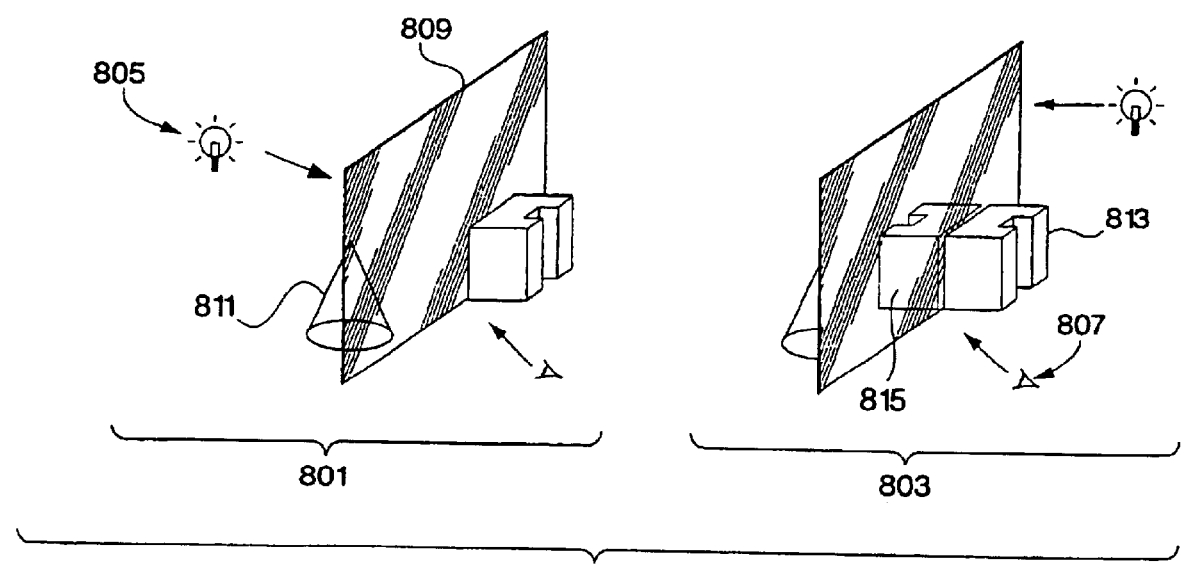
FIG. 8 shows the optics of the foil used in the reflective pad.
Figure 9:
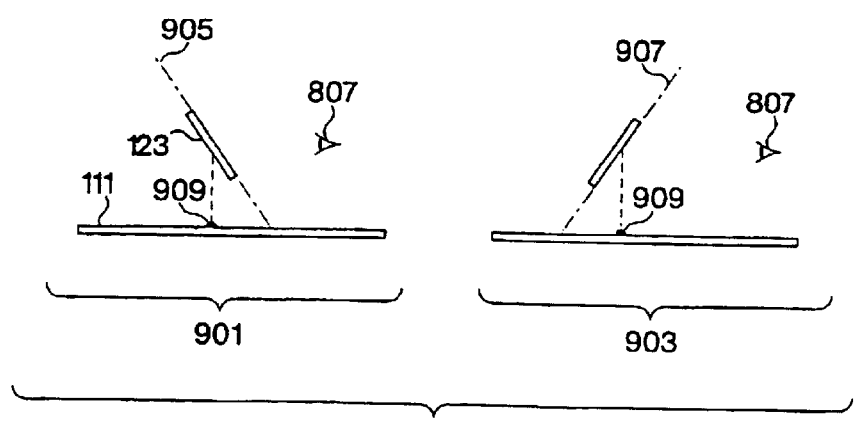
FIG. 9 shows how the angle of the transparent pad relative to the virtual table surface determines whether it is transparent or reflective.
Figure 10:
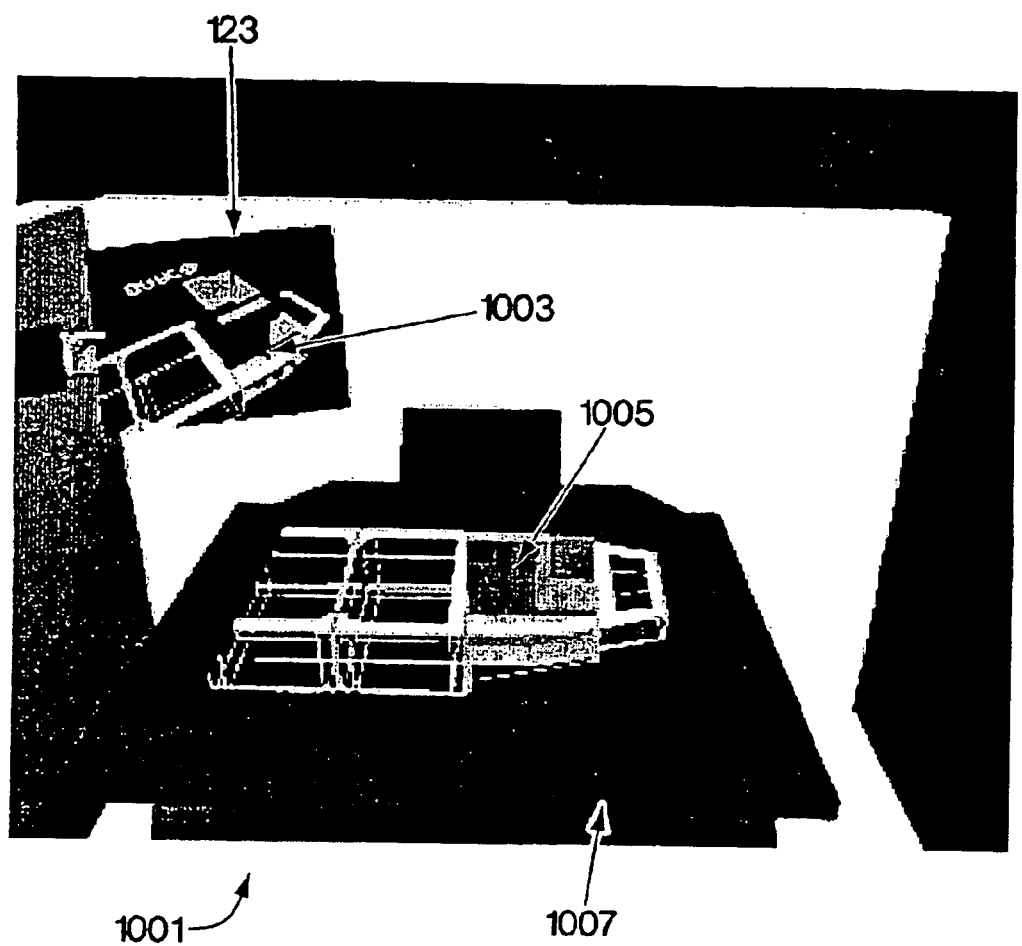
FIG. 10 shows how the transparent pad can be used in reflective mode to examine a portion of the virtual environment that is otherwise not visible to the user.

The Mirror Tool: FIGS. 8–10

The mirror tool is a special application of a general technique for using real mirrors to view portions of a virtual environment that would otherwise not be visible to the user from the user's current viewpoint and to permit more than one user to view a portion of a virtual environment simultaneously. The general technique will be explained in detail later on.

When transparent pad 123 is being used as a mirror tool, it is made reflective instead of transparent. One way of doing this is to use a material which can change from a transparent mode and vice-versa. Another, simpler way is to apply a special foil that is normally utilized as view protection for windows (such as Scotchtint P-18, manufactured by Minnesota Mining and Manufacturing Company) to one side of transparent pad 123. These foils either reflect or transmit light, depending on which side of the foil the light source is on, as shown in FIG. 8. At 801 is shown how foil 809 is a transparent when light source 805 is behind foil 809 relative to the position 807 of the viewer's eye, so that the viewer sees object 811 behind foil 809. At 806 is shown how foil 809 is reflective when light source 805 is on the same side of foil 809 relative to position 807 of the viewer's eye, so that the viewer sees the reflection 815 of object 813 in foil 809, but does not see object 811.

When a transparent pad 123 with foil 809 applied to one side is used to view a virtual environment, the light from the virtual environment is the light source. Whether transparent pad 123 is reflective or transparent depends on the angle at which the user holds transparent pad 123 relative to the virtual environment. How this works is shown in FIG. 9. The transparent mode is shown at 901. There, transparent pad 123 is held at an angle relative to the surface 111 of the virtual table which defines plane 905. Light from table surface 111 which originates to the left of plane 905 will be transmitted by pad 123; light which originates to the right of plane 905 will be reflected by pad 123. The relationship between plane 905, the user's physical eye 807, and surface 111 of the virtual table (the light source) is such that only light which is transmitted by pad 123 can reach physical eye 807; any light reflected by pad 123 will not reach physical eye 807. What the user sees through pad 123 is thus the area of surface 111 behind pad 123.

The reflective mode is shown at 903; here, pad 123 defines plane 907. As before, light from surface 111 which originates to the left of plane 907 will be transmitted by pad 123; light which originates to the right of plane 907 will be reflected. In this case, however, the angle between plane 907, the user's physical eye 807, and surface 111 is such that only light from surface 111 which is reflected by pad 123 will reach eye 807. Further, since pad 123 is reflecting, physical eye 807 will not be able to see anything behind pad 123 in the virtual environment.

When pad 123 is held at an angle to surface 111 such that it reflects the light from the surface, it behaves relative to the virtual environment being produced on surface 111 in exactly the same way as a mirror behaves relative to a real environment: if a mirror is held in the proper position relative to a real environment, one can look into the mirror to see things that are not otherwise visible from one's present point of view. This behavior 1001 relative to the virtual environment is shown in FIG. 10. Here, virtual table 1007 is displaying a virtual environment 1005 showing the framing of a self-propelled barge. Pad 123 is held at an angle such that it operates as a mirror and at a position such that what it would reflect in a real environment would be the back side of the barge shown in virtual environment 1005. As shown at 1003, what the user sees reflected by pad 123 is the back side of the barge.

In order to achieve the above behavior 1001, virtual reality system program 109 tracks the position and orientation of pad 123 and the position and orientation of shutter glasses 117. When those positions and orientations indicate that the user is looking at pad 123 and is holding pad 123 at an angle relative to table surface 111 and user eye position 807 such that pad 123 is behaving as a mirror, virtual reality system program 109 determines which portion of table surface 111 is being reflected by pad 123 to user eye position 807 and what part of the virtual environment would be reflected by pad 123 if the environment was real and displays that part of the virtual environment on the portion of table surface 111 being reflected by pad 123. Details of how that is done will be explained later.

Of course, since what is being reflected by pad 123 is actually being generated by virtual reality system program 109, what is reflected may not be what would be seen in a real environment. For example, what is reflected in the mirror might be a virtual environment that shows the inside of the object being viewed with the mirror, while the rest of the virtual environment shows its outside. In this regard, pad 123 can function in both reflective and transparent modes as a magic lens, or looked at somewhat differently, as a hand-held clipping plane that defines an area of the virtual environment which is viewed in a fashion that is different from the manner in which the rest of the virtual environment is viewed.

Details of the Mirror Tool

Scotchtint P-18 is designed not only to provide privacy, but also to protect against sunlight This sun protection feature blocks a fraction of the transmitted light. Thus, a virtual environment that is observed through the pad appears to be darker than a virtual environment that is looked at without the pad. In the preferred environment, this problem is dealt with by setting up the virtual environment so that it includes light sources that brighten the portion of the virtual environment that is being viewed through pad 123 and thereby overcome the effects of the foil. Other techniques for making pad 123 reflective may not require such tactics.

In a preferred embodiment, virtual reality system program 109 determines whether pad 123 is operating in see-through or reflective mode using two terms. The first, as shown in FIG. 9, is whether the user's eye position 807 is on the same or other side of the pad plane: If $\overline{E}$ is the user's generalized physical eye position 807 and $\overline{P}_m$ a point on pad plane 905 that is projected onto the projection plane at 909, then the transparent mode is active, if $$\text{sign}(f(\overline{E})) \neq \text{sign}(f(\overline{P}^m))$$

(i.e. the points are on opposite sides of the pad plane (901)). The reflective mode is active, if $$\text{sign}(f(\overline{E})) = \text{sign}(f(\overline{P}_m))$$

(i.e. the points 807 and 909 are on the same side of pad plane 907, as shown at 903).

This term by itself is, however insufficient. When the pad is being held so that it is perpendicular to the projection plane, small differences in the angle at which it is held will move point 909 from one side of the pad plane to the other. In fact, however, the pad is generally being used in reflective mode when it is held in a position that is perpendicular or nearly perpendicular to the projection plane.

Figure 20:
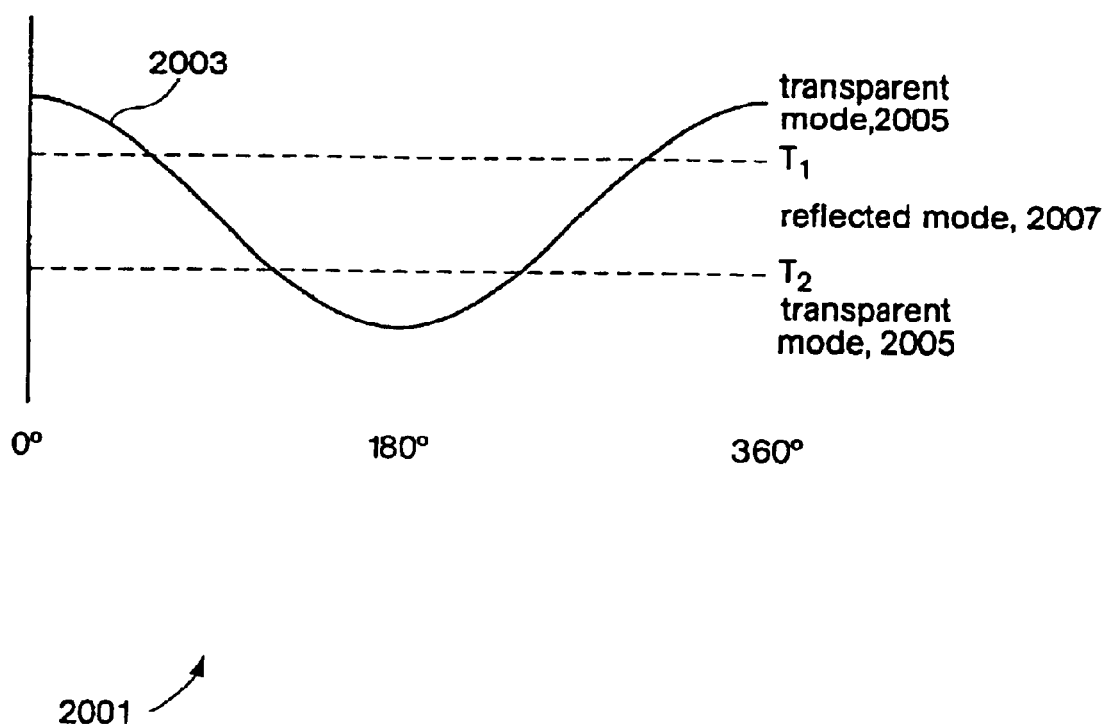
FIG. 20 shows a portion of the technique used to determine whether the pad is operating in transparent or reflective mode.

To deal with this problem, we also use another term which indicates whether the pad is being held in a position at which it is more perpendicular to the projection plane, in which case it is probably being used in reflective mode, or more parallel to the projection plane, in which case it is probably being used in transparent mode. We obtain this latter by assigning mode-specific function zones to the values of the solid angle between the two normal vectors of the planes. If the solid angle between $\overline{N}$ (normal vector of the pad) and $\overline{Z}$(normal vector of the projection plane) is defined as follows:

$$c = \cos(\alpha) = \frac{\overline{N}\overline{Z}}{|\overline{N}||\overline{Z}|},$$

then c will indicate whether the pad is relatively perpendicular to or parallel to the projection plane and therefore whether the pad is being used in reflective or transparent mode. FIG. 20 shows how this is done in a preferred embodiment. Graph 2001 shows curve 2003 with the values of c for differences in the solid angles between the pad and the projection plane ranging from 0° (pad parallel to the projection surface) through 90° (pad perpendicular to the projection surface), 180°(pad again parallel), and 270° (pad again perpendicular) to 360° (pad again parallel). $T_1$ and $T_2$ are threshold values that define how the virtual environment system is to interpret the value of c. If c's value is between $T_1$ and $T_2$, the pad is in reflective mode 2007 and if it is above $T_1$ or below $T_2$, it is in transparent mode 2005. In the preferred embodiment, $T_1$ is set to 0.5 and $T_2$ to $-0.5$.

To determine whether the pad is in reflective or transparent mode, we combine the above two terms according to the following algorithm:

$$M = \begin{cases} \text{reflective}, & ((c < T_1) \text{ AND } (c > T_2)) \text{ OR } (\text{sign}(f(\overline{E})) = \text{sign}(f(\overline{P}_m))) \\ \text{transparent}, & ((c \geq T_1) \text{ OR } (c \leq T_2)) \text{ AND } (\text{sign}(f(\overline{E})) \neq \text{sign}(f(\overline{P}_m))) \end{cases}$$

Functions of the Reflective and Transmitting Modes in a Preferred Embodiment

Major functions of the transparent and reflective modes of operation of pad 123 include the following:

Transparent mode: interaction (window-tools, magic-lenses, etc. as described in the foregoing)

Reflective mode: complementary navigation (difficult-to-reach viewing/interaction, clipping-plane-in-hand, etc.)

Even though the modes are complementary in most cases, a certain overlap exists. On the one hand, the two-handed interaction in combination with a tracked pen would also be supported in the reflective mode (interaction with the reflection space), and seems to be an interesting possibility to interact from "difficult-to-reach" positions (e.g. in the inside of objects, etc.). On the other hand, navigation (clipping-plane-in-hand, etc.) can also be realized in the transparent mode. Note, that this is an example for an overlap of the application possibilities, but it is still complementary in the interaction range.

Beside the clipping plane defined by $$f(x,y,z)+\Delta,$$

an additional one can be found that might be set up to support back-plane clipping from both sides of the pad plane, in both the transparent and the reflective mode. The proper one has to be activated with respect to the active mode, and the side of the pad plane the user is located at:

| Transparent mode | | Reflective mode | |
|---|---|---|---|
| $f(\overline{E}) \geq 0$ | $f(\overline{E}) < 0$ | $f(\overline{E}) \geq 0$ | $f(\overline{E}) < 0$ |
| $-f(x,y,z) - \Delta$ | $f(x,y,z) + \Delta$ | $f(x,y,z) + \Delta$ | $-f(x,y,z) - \Delta$ | interact within the current visibility scope, and objects can be reached that are not visible under other circumstances.

Furthermore, we can overload the transparent, as well as the reflective mode with a multitude of different functionality. The user can activate different modes that are supported by the two different sides of the transparent pad. Thus, for instance, window-controls (such as buttons, sliders, etc.) are offered on the one side, and through-the-plane tools (such as magic lenses, etc.) are provided on the other side. The user can switch between them at pleasure, by turning over the pad. When pad 123 is given a reflective mode, it effectively has four sides, two in each mode, and each of these sides can have a different functionality.

Figure 11:
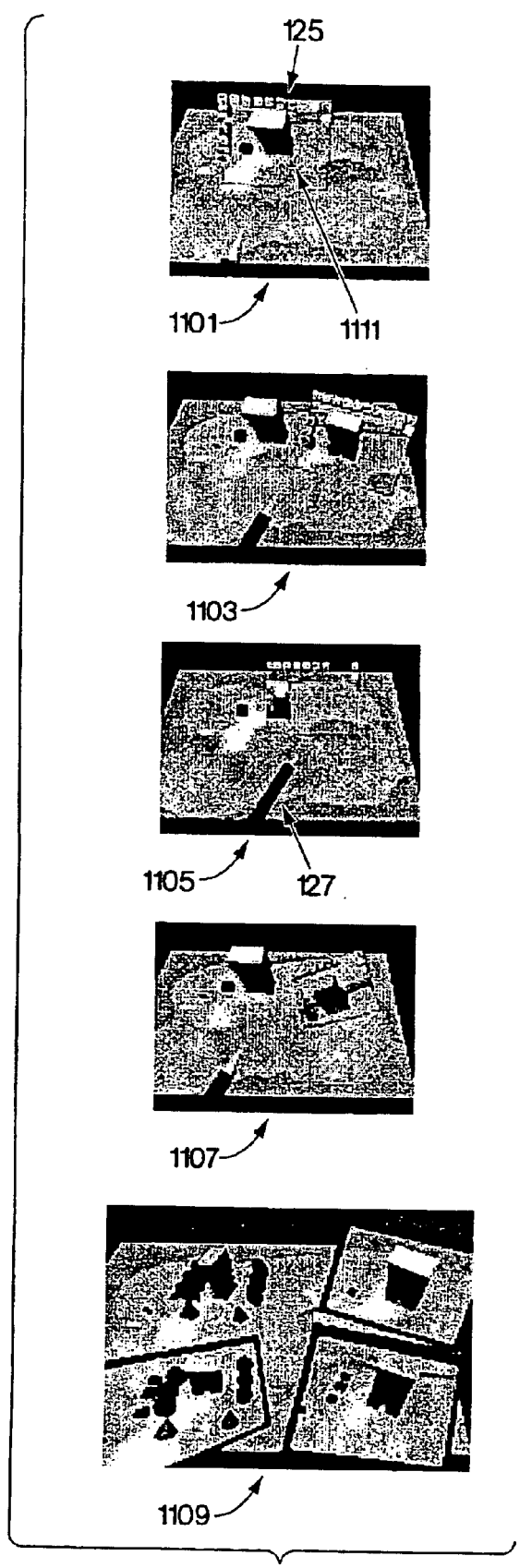
FIG. 11 shows how the transparent pad may be used to capture a snapshot.
Figure 12:
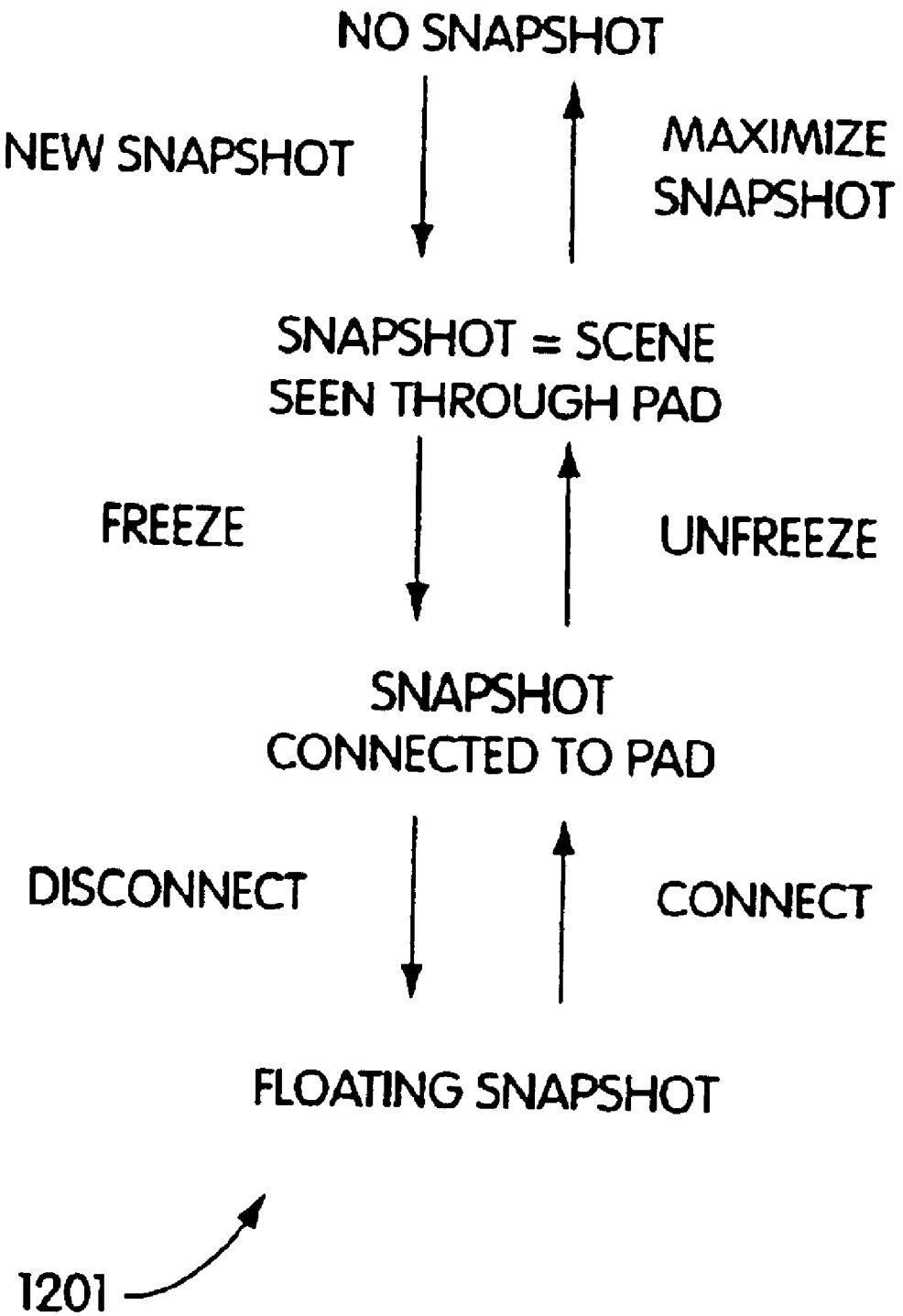
FIG. 12 shows a state diagram for the transparent pad when used to capture 3-D snapshots.

Snapshot Tools: FIGS. 11 and 12

While the X-ray tool is an example of a modified view of the environment, a window can also show different content. Windows in the desktop world usually show different content: multiple windows can either be entirely unrelated, or they can show data from different points in space (different viewpoints) or time (different versions). CAD systems normally use four windows with different viewpoints, and text tools like xdiff show a side-by-side comparison of different versions of data.

We built this idea of multiple views into the landscaping application using a snapshot facility. In normal mode, the view through transparent pad 123 is identical to what the user sees without transparent pad 123. However, a user can choose a particular view (or more precisely, viewpoint) of the scene as currently seen through pad 123 and can then lock that view onto pad image 125, as shown at 1101 in FIG. 11. This snapshot 1111 is not a flat photograph, but a real 1 3D scene that can be viewed from an arbitrary angle and distance by moving the pad or one's head. To see this, compare the snapshots 1111 in 1103 and 1107 with that of 1101.

Such a snapshot 1111 may be decoupled from pad image 123 and left floating in the scene at any position, and possibly be picked up again later. By strategically placing a number of such snapshots in the scene, a user can inspect multiple views at once from inside a virtual environment, a strategy equivalent to the aforementioned multiple views of CAD systems.

Changes to the objects are reflected in all views simultaneously. However, if the user indicates so, the scene observed through the window can be isolated from the scene shown on the table and from other windows' scenes; thus multiple individual scenes are seen simultaneously. This feature resembles a multiple document interface from the desktop world, an aspect that to our knowledge has not been explored for virtual reality systems so far. When scenes are isolated in multiple windows, changes to one scene are not reflected in another scene. It is therefore possible to modify the main scene on the virtual table while the scene in the window remains the same: it becomes a historical reference.

For the landscaping applications, multiple versions of development (or possible design alternatives) can be presented side by side with little effort by the user. This feature is potentially very useful for any kind of 3D-design application. By picking up a floating window that is carrying a particular variant of a scene and unlocking the frozen viewpoint of the window (i.e. the scene through the window is again rendered with the same viewpoint as the scene on the VT), a special kind of portable magic lens for in-place comparison of two variants is created. An example is shown at 1105, where the large building has been deleted in the virtual environment but is still visible through the snapshot. The possibilities of the snapshot tool are summarized in FIG. 12 in the form of a state diagram 1201.

Figure 13:
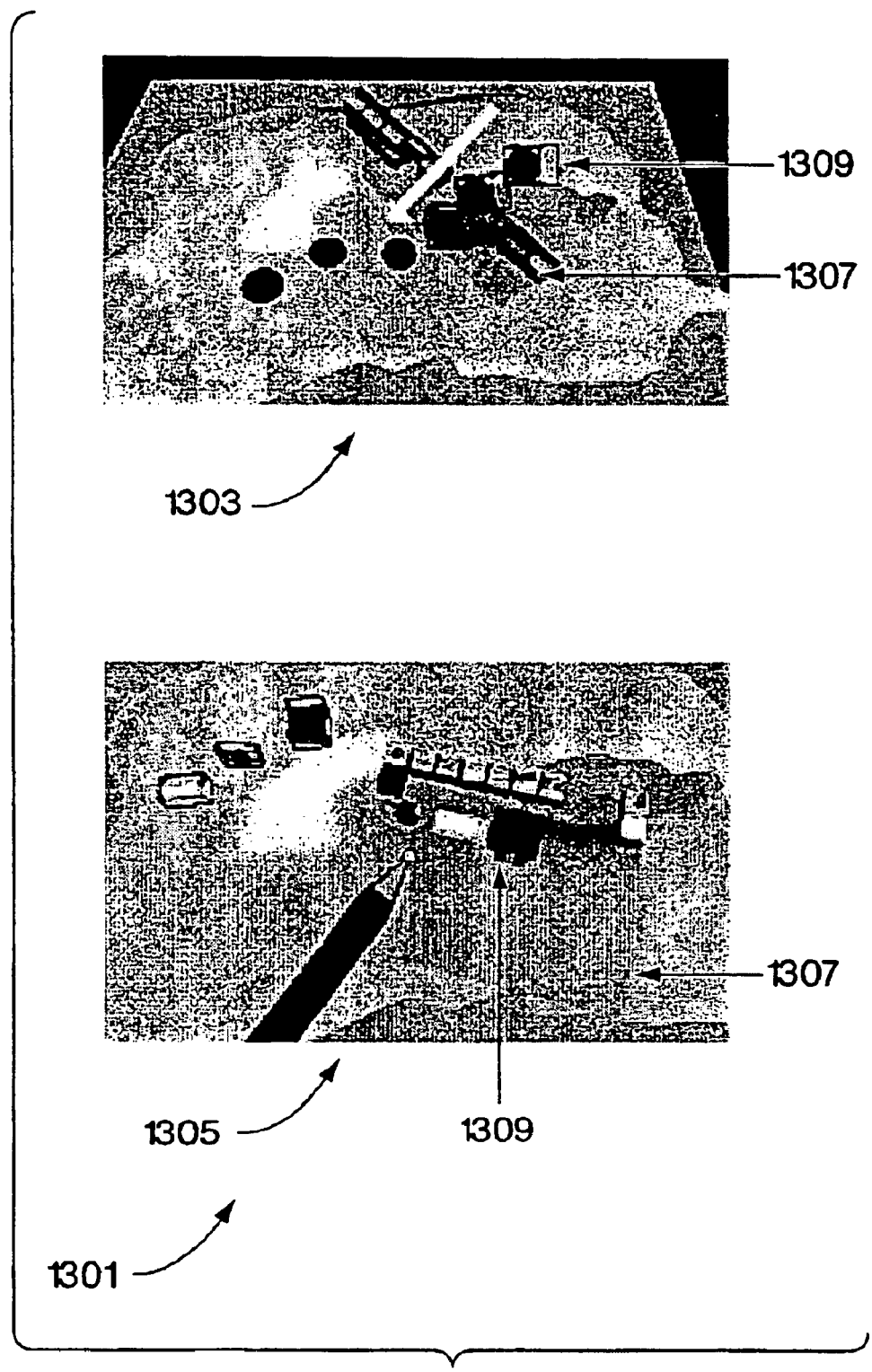
FIG. 13 shows projected pad 125 being used to select items in the virtual environment by sweeping through the virtual environment.

Volumetric Manipulation Tool: FIG. 13

A common characteristic of conventional 3D manipulation tools like a bat, wand, stylus, or buttonball, is the tool's dimension: all these devices have a zero-D (point-shaped) "hot spot" for triggering actions. Tools that select objects at a distance use a ray to select the object and therefore have a dimension of one. Errors introduced by human inaccuracy make it difficult to perform precise manipulation with tools like these, which have essentially no spatial extent, unlike real world tools, which always have a spatial extent. The lack of spatial extent of the tools used to manipulate virtual environments is one reason for the development of techniques such as 3D snap-dragging.

Pad image 125, unlike the points and rays produces by conventional 3D manipulation tools, has two dimensions, and thus has spatial extent in the same way that a real world tool does. An example of how the spatial extent of pad image 125 can be used to manipulate the virtual environment is pad image 125's use as a fishnet selection tool for the landscaping application, shown in FIG. 13. When transparent pad 123 is being used in fishnet mode, the user selects the fishnet mode (for example, by pushing a button on pad image 125) and then moves transparent pad 123 so that pad image 125 sweeps through the virtual environment, as shown at 1303, where pad image 125 appears at 1307. Objects in the virtual environment that are encountered by pad image 1307 during the sweep, such as object 1309, are selected. Small 3D replicas of the selected objects appear on the surface of pad image 125, as shown at 1305. The replicas appear in the position on pad image 125 where the pad image encountered the object, and an "arrange" button may be used to align the replicas in a regular grid on pad image 125 for better overview. The results of such an "arrange" operation are shown at 1305.

We've found that sweeping a path with pad image 125 is surprisingly effective for the selection of objects that lie in front of the projection plane of the table, especially when a large number of objects must be selected quickly but selectively. We attribute this ease of use to the users' real world experience with similar tools.

Sometimes it may happen that an object is involuntarily selected together with others. If this occurs, the small replicas on the pad can be discarded by using pen 121 to cause pen image 127 to remove them from pad image 125, thereby deselecting the corresponding object in the virtual environment.

Although we have not yet implemented them, we have imagined several other volumetric manipulation tools that would work like the fishnet, such as a shovel, a ruler, and a rake. Another possible area of application is deformation tools for objects made of clay.

Figure 14:
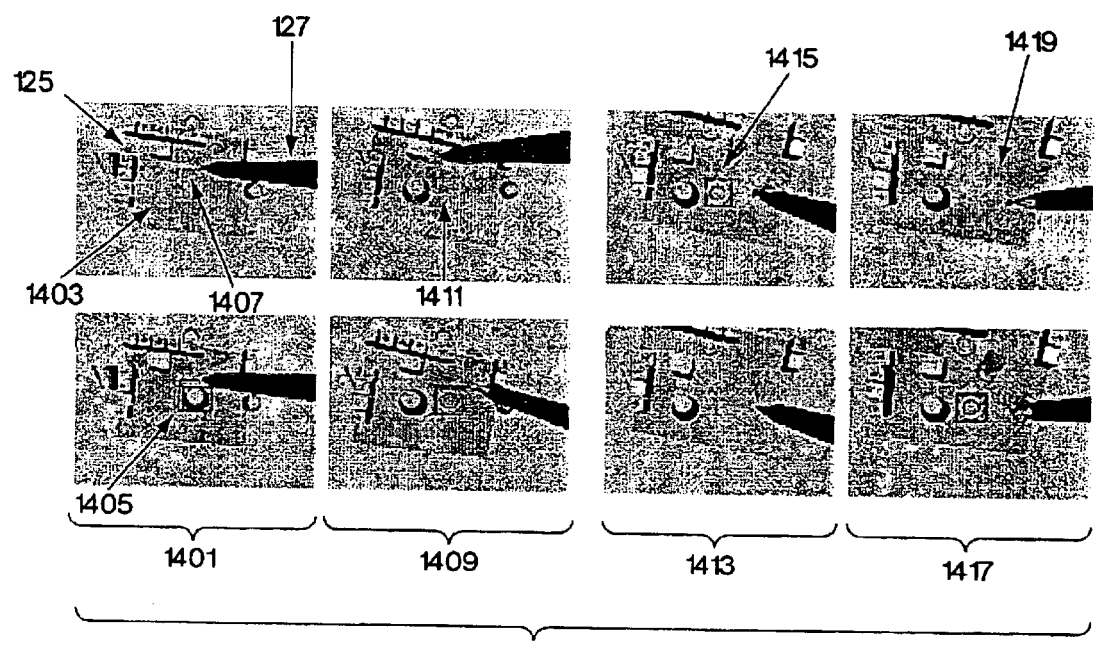
FIG. 14 shows the use of gestures to create objects in the virtual environment and to control the objects.
Figure 15:
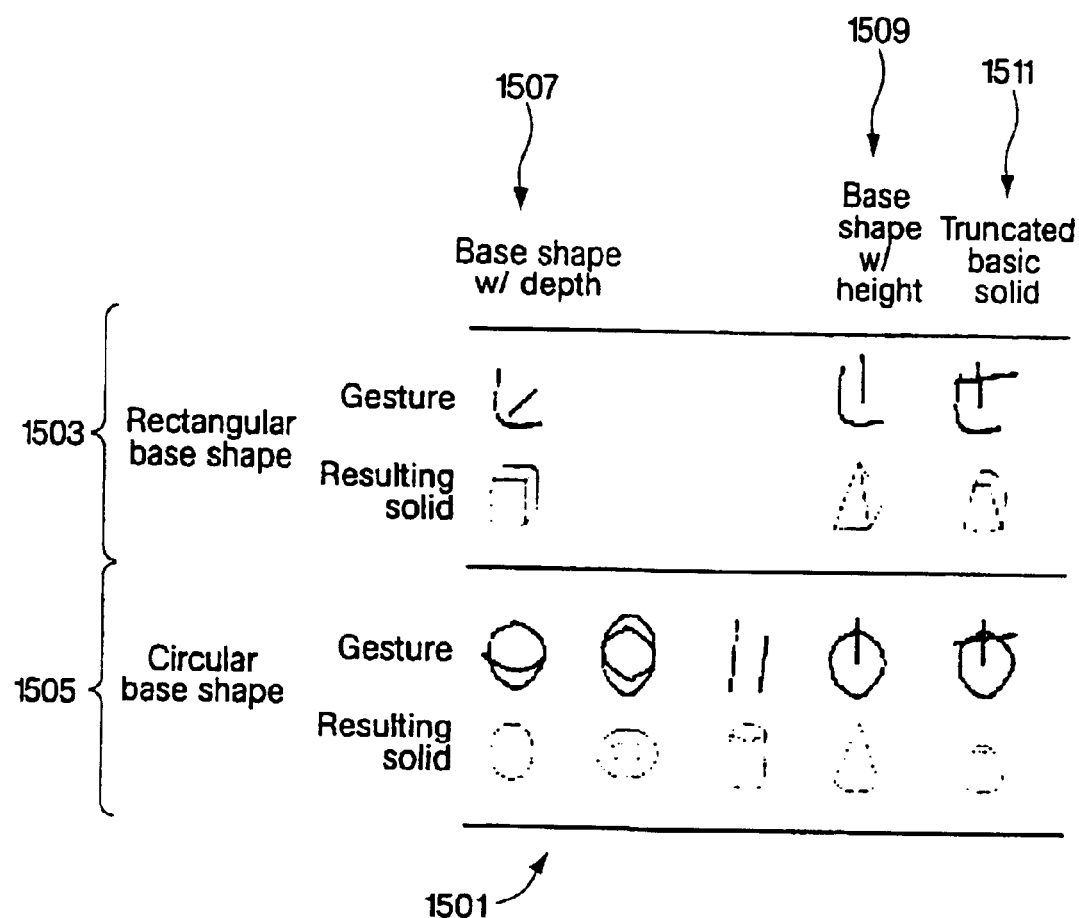
FIG. 15 shows the gestures used to create objects in a preferred embodiment.

Details of Using Pad Image 125 as a Sketch Pad: FIGS. 14–16

The discussion of the palette metaphor showed how marks made by pen image 127 on pad image 125 could be used to specify interactions with the virtual environment.

The fact that the user can make marks on pad image 125 by moving pen 121 on pad 123 permits pad image 125 to be used as a kind of sketch pad: not only can pen 121 be used to specify commands, it can also be used to specify objects. How this is done in a preferred embodiment is shown in FIG. 14. As may be seen in set of images 1401, in a preferred embodiment pad image 125 is placed in sketch pad mode by using pen image 127 to depress a button 205 on the surface of pad image 125.

Shown in each of the images of FIG. 14 are pad image 125 and pen image 127. Set of images 1401 shows the gesture that specifies a truncated cone. The gesture is made up of three strokes. The first stroke is a circle 1425, which defines the base contour of the cone; the second and third strokes are shown at 1407. The vertical stroke defines the height of a cone having the base contour defined by the first stroke; the horizontal stroke indicates where the cone defined by the circle and the vertical stroke is to be truncated. The strokes are of course made by moving pen 121 on or near pad 123.

Set of images 1409 show the two gestures needed to make a torus at 1411, namely two circles that are more or less concentric, with one circle representing the outside diameter of the torus and the other the inside diameter. At 1413 is shown how the cross-out gesture 1415 can be used to remove an object from pad image 125 and at 1417 is shown how "undo" gesture 1419 can undo the deletion of 1413.

Detail of Object Creation with Gestures: FIG. 15

The gestures that are used for object creation were developed to be as intuitive as possible, to ensure easy memorization. In addition, since the user looks through the transparent pad onto the scene that is displayed on the Virtual Table, the gestures have been designed to follow the contours of the top-down projection of the corresponding solid geometries as closely as possible. This differentiates our approach from the one presented in the SKETCH system referred to in the Description of related art. In that system, the user mainly outlines the side-view contours of an object to generate basic solids. Top-view outlines are used in Sketch in a special bird's-eye mode to produce 2D contours to define the silhouettes of 3D geometry created in a subsequent step.

FIG. 15 shows the gestures employed to create objects in a presently-preferred embodiment. Each gesture consists of one or more strokes of pen 121 that are performed on or close to pad 123. The entire gesture is defined by pressing pen 121's button before the first stroke of the gesture and releasing it after the last stroke. The pen and pad are used much like pen and paper, except instead of actually drawing a shape, the computer scans the strokes made on the pad. The strokes' proximity to the pad determines whether or not they contribute to the gesture to be recognized.

Table 1501 of FIG. 15 shows the gestures: row 1503 shows gestures that create objects having a rectangular base structure; row 1505 shows gestures that create objects having a circular base structure. Column 1507 shows the pen strokes for rectangular solids, spheres, and toruses; column 1509 shows the pen strokes for pyramids and cones; column 1511 shows the pen strokes for truncated pyramids and cones. In most cases, one pen stroke indicates the base shape and another indicates the extent of the base shape's third dimension. Gestures for truncated solids resemble their non-truncated equivalent in that a horizontally cutting finishing stroke is added to the height stroke. Obviously, special solutions must be developed for cylinder, sphere, and torus generation, since these objects would be created using ambiguous gestures. Therefore, the cylinder gesture makes the exception of employing its side-view contour by being defined through two parallel lines. The torus is defined by two circular gestures. This leaves for the sphere a circular gesture and an arc gesture, which indicates the sphere's curvature in all dimensions. Although several of the gestures appear to be similar, the rate of recognition of the gestures by virtual reality system program 109 is generally between 95% and 100%.

Gesture-Based Object and Mode Control: FIG. 16

The defined gestures for object manipulation and control are currently limited to the selection and deletion of objects, as shown in FIG. 6. Additional control gestures are have been devised to indicate mode changes, thus relieving the user interface apparent on the pad from unnecessary dialogue buttons. FIG. 16 shows all of the presently-defined gestures for object control and mode change in table 1601. The gestures for object control are shown at 1603; those for mode change are shown at 1605. Although several gestures appear again to be similar, the recognition rate by the system is again between 95% and 100%. Objects are selected by circling their projected images when the images are viewed through the pad. In a similar way, objects are deleted by "crossing them out" on the pad. Undo is represented by a "scribbling" on the pad, thus resembling the erasure of mistakes on common paper. All of this is shown at row 1603 of table 1601.

Gestures Representing Letters and Numbers

In many cases, the easiest way for a user of a program to input information to it is by means of strings of letters or numbers. In modern two-dimensional GUI's, the user typically employs a keyboard to input the letters or numbers into fields in a dialog box. The fields are typed, and if the user attempts to put the wrong kinds of values in them, for example, letters in a number field, the GUI indicates an error. Inputting strings of letters or numbers when the interface to the program is a virtual environment is much more difficult. First, dialog boxes are much less intuitive in virtual environments than they are in two-dimensional GUIs, and second, even if one had a dialog box, it is not clear how one would write to it.

Virtual environment system 101 with the interface provided by transparent pad 123 and pen 121 solves both of these problems. Since virtual environment system 101 can display anything on projected pad 125, it can also display the equivalent of a dialog box on projected pad 125, and since the user can use pen 121 to "write" on transparent pad 123, with corresponding marks appearing on projected pad 125, all that is needed to be able to use pen 121 and pad 123 to fill in fields in a dialog box appearing on projected pad 125 is to extend the gestures which virtual environment system 101 recognizes to include gestures representing letters and numbers.

In a preferred embodiment, this has been done by extending virtual environment system 101 to recognize gestures belonging to the Graffiti® unistroke character set used in many palm-sized computing devices. Letters, numbers, and punctuation are represented in Graffiti by means of single strokes, with characters being disambiguated if necessary by whether they are being written into a number field or a character field. Graffiti is explained in detail in C. H. Blinkenstorfer, "Graffiti", *Pen Computing*, 1995, pp. 30–31. In the preferred embodiment, projected pad 125 includes not only the fields of the dialog box, but also a large area for numeric inputs and another large area for character-string inputs. The user uses the pen to select a field in the dialog box and then writes in the proper large area using Graffiti strokes. As virtual environment system 101 recognizes a gesture, it places the character corresponding to the gesture in the selected field of the dialog box. Because the Graffiti gestures are single-stroke gestures and the range of possibilities is limited by the context in which the user is making the Graffiti gestures, there is no need to train virtual environment system 101 to recognize Graffiti input from different users.

Learning Gestures

As indicated above, gestures are made up of one or more strokes, with the user indicating the beginning of a gesture by pushing the button on pen 121 and the end of the gesture by releasing the button. Recognizing a gesture in the preferred embodiment is a two-step process: first, recognizing what strokes have been made, and then determining whether there is a gesture that consists of that combination of strokes. A gesture is thus represented simply as a set of strokes.

The teaching of gestures to the system and the correction of recognition errors are accomplished using dialogue elements on the pad such as buttons 205. In a preferred embodiment, a button is associated with each of the following events:

Loading a set of gestures from a file,

Saving to a file the currently loaded and recently added gestures,

Issuing the 'Learn' command to the recognizer using the most recently performed gesture, and Advancing to the next gesture index.

The last event is especially helpful when initially teaching the system each of the gestures one by one. Also when a gesture is incorrectly recognized, this button can be used to add a variation of a gesture to help clarify and hone the process. For instance, the creation of a torus as shown at 1411 of FIG. 14 can be accomplished by penciling two circles onto the pad which are intersecting or not. This allows for much more 'sloppiness' in the user's drawing, i.e. for true sketching.

Transforming an expressed gesture into a meaningful statement can be a computationally intensive task and may not be easy to achieve in real-time (i.e. together with rendering, tracking etc.). Usually techniques of artificial intelligence and machine learning are applied to solve classification problems such as the recognition of gestures or speech. Earlier approaches (e.g. based on neural networks or hidden Markov models) usually are lacking in predictability, flexibility, or performance of the learning process. Since most of the earlier approaches are based on recognition of state-based gestures, we used fuzzy logic to recognize motion-based gestures to see whether that would overcome the difficulties of the earlier approaches.

The method described recognizes previously learned gestures. System 101 was taught these gestures by having a user perform them at runtime. Any kind of 2D, 3D, or 6DOF input device can be used to gather the motion data that carries out the gesture. The reliability of the recognition process can be improved by repeating the same gestures several times and correcting incorrect recognition results. This extends the system's knowledge. Once the system has learned the gesture, it translates the recognized gesture into an object which processor 103 can identify (numbers, strings, events, etc.) and process further.

Recognizing Strokes of a Gesture

The strokes of a gesture are recognized using software in virtual reality system 109 that is executing in processor 103 as follows: first, the software accepts the raw position and orientation data for a stroke. Then, in a three-stage process, the raw position and orientation data is first used to continuously update the stroke-specific basic information (e.g. bounding box, length, orientation etc.) on the fly. Once updated, the stroke-specific basic information serves as a basis for calculating a set of fuzzy values that characterizes the stroke in the second stage. Approximated reasoning is dynamically applied to express the trust in each characterization criteria (so-called aspect), depending on the appearance of extreme situations. Combined, each individual set of aspects represents a product rule that describes the degree of membership of the stroke being interpreted in a specific class of strokes. These product rules are finally used to find the stroke with the best match among the already learned ones. To do so, we compare the aspect set of the stroke to be identified with the ones stored in the knowledge-base. The stroke with the smallest total deviation is suggested as the most-likely candidate.

Description of the Basic Information

The basic information consists of stroke-dependent properties that are continually updated during scanning of a stroke. This information is the basis for computing the characterization aspects. Because all of the basic information is treated similarly, we will only discuss the processing of position data in detail. Orientation information (e.g. azimuth, elevation and roll alignments) are treated in the same way.

If we assume that the position data is represented as follows:

$$G=(x_0,y_0,z_0),(x_1,y_1,z_1),\ldots,(x_{n-1},y_{n-1},z_{n-1})$$

for a stroke G described with n position samples, then the edges of its bounding box can be calculated with:

$$\text{left}=\min(x_1,\text{left}),\text{right}=\max(x_1,\text{right}),$$

$$\text{bottom}=\min(y_1,\text{bottom}),\text{top}=\max(y_1,\text{top}),$$

$$\text{back}=\min(z_1,\text{back}),\text{front}=\max(z_1,\text{front}),$$

The total length of the stroke is:

$$l=\sum_{i=1}^{n-1}\sqrt{\Delta x_i^2+\Delta y_i^2+\Delta z_i^2}$$

with $$\Delta x_1=x_1-x_{i-1},\ \Delta y_1=y_1-y_{i-1},\ \Delta x_1=z_1-z_{i-1}.$$

The horizontal, vertical and depth movements are:

$$hm=\sum_{i=1}^{n-1}|\Delta x_i|,\ vm=\sum_{i=1}^{n-1}|\Delta y_i|,\ dm=\sum_{i=1}^{n-1}|\Delta z_i|$$

The center of gravity is:

$$cx=\sum_{i=1}^{n-1}x_i,\ cy=\sum_{i=1}^{n-1}y_i,\ cz=\sum_{i=1}^{n-1}z_i$$

The angle coefficients (legs of a triangle) used to calculate the directions of the stroke's start and end sections are:

$$sax=\sum_{i=1}^{n-1}\frac{\Delta x_i}{(l_1^i)^p},\ say=\sum_{i=1}^{n-1}\frac{\Delta y_i}{(l_1^i)^p},\ saz=\sum_{i=1}^{n-1}\frac{\Delta z_i}{(l_1^i)^p},$$

-continued $$eax = \sum_{i=1}^{n-1} \Delta x_i (l_1^i)^p, \; eay = \sum_{i=1}^{n-1} \Delta y_i (l_1^i)^p,$$

$$eaz = \sum_{i=1}^{n-1} \Delta z_i (l_1^i)^p$$

where $l_1^i$ is the momentary length of the stroke (from segment 1 to segment i). The angle coefficients are used later to calculate the stroke's start and end angles, and to represent its directions (x,y,z components) at the beginning and the end. Note that with increasing distance from the start position (and decreasing distance to the end position), the weights of the start-angle-coefficients (sax,say,saz) decrease while the weights of the end-angle-coefficients (eax,eay,eaz) increase. This causes a sufficiently realistic weighting of the stroke's start and end sections and prevents the computation from taking the distortion into account that usually appears at the beginning and the end (e.g. introduced by the tracking device or the user). The exponent p is used to control how fast the weights increase or decrease (with respect to the length of the stroke). Experimentally, we have chosen p=2 for our examples.

To achieve a higher reliability, we do not use the original motion information only. We also rotate the original positions around the x, y, and z axes and calculate the basic information (as described above) for the rotated information as well. This makes it possible, for example, to track the diagonal movements. In our example we rotate the original positions by 45° to achieve a higher performance. As a result we can replace the time costly sine and cosine functions by multiplications with the constant factor c=sin(45°)=cos(45°) ≅0.7071067, yielding:

$$xR_i = c(c(x_i + c(y_i + z_i)) - c(y_i - z_i)),$$

$$yR_i = c(c(x_i + c(y_i + z_i)) + c(y_i - z_i)),$$

$$zR_i = c(c(y_i + z_i)) - x_i)$$

Furthermore, we do not have to perform all multiplications, because scaling of the stroke does not affect the result.

Characterizing Strokes

After the stroke is scanned and the specific basic information is obtained, we can calculate fuzzy values (aspects) that express the grade of membership to their fuzzy sets (e.g. the set of intricate strokes, the set of flat strokes, etc.). Note, that in the following we will discuss only a subset of the defined aspects to illustrate the principles. For performance reasons, we use an integer representation, thus the aspects are normalized to a range of [0,100].

A stroke's length is at least as long as the diagonal of its bounding box. We use the ratio:

$$a_0 = \frac{\sqrt{\text{width}^2 + \text{height}^2 + \text{depth}^2}}{l} \cdot 100$$

with width=right−left, height=top−bottom, depth=front−back to describe this relation. Results of around 100 indicate that the stroke describes a straight line (i.e. the smaller the value, the more intricate and complex the stroke).

We use the following equation to describe the bounding box's height/width ratio:

$$a_1 = \frac{\text{height}}{\text{height} + \text{width}} \cdot 100$$

Values of around 50 indicate a square height/width relation. We can derive: The smaller the value, the wider the bounding box; and the larger the value the higher the bounding box. Similar ratios can be calculated to express the height/depth ($a_2$) and depth/width ($a_3$) relations; and the relations for the rotated stroke ($a_4, a_5, a_6$).

To express the relative start and end positions, we can use the following ratios:

$$a_7 = \frac{x_0 - \text{left}}{\text{width}} \cdot 100, \; a_8 = \frac{y_0 - \text{bottom}}{\text{height}} \cdot 100, \; a_9 = \frac{z_0 - \text{back}}{\text{depth}} \cdot 100$$

Values close to 100 indicate that the stroke does begin close to the specific face (right, top, front). Values of around 50 indicate that the stroke begins at the center, and values close to 0 indicate that it begins at the corresponding opposite sides (left, bottom, back) of the bounding box. Similar ratios can be formulated for the end position ($a_{10}, a_{11}, a_{12}$).

The sum of all horizontal movements is at least as great as the width of the bounding box. We use the following ratio to form a useful statement:

$$a_{13} = \frac{\text{width}}{hm} \cdot 100$$

For example:

We obtain a value of around 33 if the projected stroke describes a 'Z' on the x/y-plane. If it describes an 'M', the result is nearly 100; and if it describes a 'C', we obtain a value of around 50. Similar values can be calculated for the vertical and the depth movements ($a_{14}, a_{15}$), and for the rotated stroke ($a_{16}, a_{17}, a_{18}$).

To determine in which direction the stroke starts and in which it ends, we calculate the start and end angles using the horizontal/vertical and depth angle-coefficients, which have been tracked during the scanning process. These computed angles represent the stroke's direction at the beginning and the end (x,y,z components). The angles are calculated based on the stroke's projection onto the x/y-plane, x/z-plane and z/y-plane. Note, that the angle-coefficients represent a weighted sum of the movements with increasing weights for the end-angle-coefficients (the closer we get to the end) and decreasing weights for the start-angle-coefficients (the further the distance from the beginning). This causes a sufficiently realistic weighting of the stroke's start and end sections and prevents from taking the distortion into account that usually appears at the beginning and the end (e.g. introduced by the tracking device or the user).

We calculate the angles at the beginning as follows:

$$a_{19} = \text{angle}(sax, say), a_{20} = \text{angle}(sax, saz), a_{21} = \text{angle}(saz, say)$$

where angle(x,y) calculates the angle by normalizing the result of $$a = a\cos\left(\frac{x}{\sqrt{x^2 + y^2}}\right)$$

to the range of [0,100] with:

$$b = \begin{cases} 2\pi - a : y < 0 \\ a : y \geq 0 \end{cases}$$

and consequently $$\text{angle}(x, y) = \frac{b}{\pi} \cdot 50.$$

A similar process is used for the angles at the end $a_{22}, a_{23}, a_{24}$).

As done for $a_1 \ldots a_{12}$, we can express the relative position of the stroke's center of gravity with:

$$a_{25} = \frac{cgx - \text{left}}{\text{width}} \cdot 100, \; a_{26} = \frac{cgy - \text{bottom}}{\text{height}} \cdot 100,$$

$$a_{27} = \frac{cgz - \text{back}}{\text{depth}} \cdot 100$$

$$\text{with } cgx = \frac{cx}{n}, \; cgy = \frac{cy}{n}, \; cgz = \frac{cz}{n}.$$

width height depth

The additional processing of the orientation data increases the number of aspects from 28 to 56.

Search for Matching Strokes

Combined, the aspects form a product rule that classifies the stroke. For example:

IF

'is absolutely not straight' AND

'is more or less flat' AND

...

THEN

'it might be a circle-like stroke'

An important feature of our fuzzy system (in contrast to others) is that we don't want the user to define rules that characterize motion-based strokes, but that we want the system to learn these rules in terms of differentiating between strokes and recognizing them. Thus the system must be able to automatically generate a new product rule every time it is taught a new stroke (or a new representation of an already learned stroke). Note that the strokes that must be recognized are not known in advance, thus a manual specification of product rules that describe them is not possible. It is important that the system evaluates these rules in a way that allow it to draw the right inference, depending on a possibly large number of generated rules. A rule is represented by a set of fuzzy values (i.e. the individual aspects that characterize a stroke) and is specified by a single representation of a stroke. Note that it is likely that more than one representation of the same stroke exists, in terms of being able to recognize it. To identify the rule that matches best, and so draw the right inference (i.e. recognize the stroke), we compare each fuzzy value (i.e. each aspect) of the current rule with the corresponding value of the already learned rules. The rule with the lowest deviation is the one with the highest probability for drawing the right inference.

Some fuzzy systems allow the user to specify the degree of faith in these rules. This is called approximate reasoning and is usually implemented by multiplying the inferred fuzzy values by predefined weights that represent the user's faith in particular rules (e.g. 0.8 represents high, 0.2 represents low). We apply approximate reasoning by weighting each aspect deviation to indicate its importance in terms of inferring the correct conclusion. Some of these weights can be set up manually by the user to indicate the general importance of the aspects, but most of the weights are calculated dynamically (e.g. depending on the appearance of extreme cases), because the rules (as well as an indication of the faith in these rules) are not known in advance, but are learned by the system.

After all aspects of the stroke to be identified have been calculated, we can compare them with the aspects of the already learned strokes to find the closest match. We use two simple methods to identify deviations or correspondences. One method can be chosen for each specific aspect. The first method simply calculates the absolute difference of two corresponding aspects, while the second one calculates the ratio of the smaller value to the larger value. We prefer the second method to compare aspects that express distance relations (such as in $a_1, a_{13}, a_{14}, a_{15}$, etc.), and the first method to compare aspects that express distances (e.g. the relative distance of two points to a face of their bounding box, i.e. $a_7, a_8, a_9$, etc.). Note that the results are normalized again to the range of [0,100]. A value of 0 indicates identity and a value of 100 indicates maximum deviation.

$$C_1(a_i, b_i) = |a_1 - b_1|,$$

$$C_2(a_i, b_i) = 100 - \frac{\min(a_i, b_i)}{\max(a_i, b_i)} \cdot 100$$

The total deviation of two strokes can be represented as the weighted sum of all individual deviations:

$$td = \sum_{i=0}^{m-1} (w_i C_i(a_i, b_i))^2$$

where $a_i, b_i$ are aspects that describe the same characteristic, $w_i$ is the aspect specific weight that is used to implement approximate reasoning, and m the number of aspects of a product rule.

The recognized stroke is the one with the smallest total deviation among the already learned strokes. Note that the terms are squared to emphasize the effect of larger deviations and to reduce the effect of smaller deviations. If we normalize the total deviation to the range of [0,100], we can compare it to a threshold value; thus we can derive that no stroke was recognized if the smallest total deviation is too high (i.e. above the threshold). The normalization can be done as follows:

$$td' = \sqrt{\sum_{i=0}^{m-1} \left( \frac{w_i^2}{\sum_{i=0}^{m-1} w_i^2} C_i(a_i, b_i)^2 \right)}, \; 0 \leq td' \leq 100$$

Note, that normalization is not necessary to find the smallest total deviation and should not be done if it is not compared with a threshold. This increases the efficiency of the comparison process. Not only can the method of comparison be chosen for every individual aspect, the specific weights can also be set up in advance to indicate the aspect's importance and strength (the larger the weights the higher the strength of the aspect). For example, $a_0$ would have a large weight, because the peculiarity 'whether the stroke is straight or intricate' is important information.

A major problem arises if extreme edge relations of the bounding box appear (e.g. an absolutely flat bounding box, etc.). If this happens, we cannot trust the significance of some aspects, thus we must apply approximate reasoning dynamically. To overcome this problem, we modify the weights of such critical aspects (e.g. $a_8, a_9, a_{11}, a_{12}$, etc.) during runtime, thus reducing their effect on the total result in such extreme cases.

If we split the weight w, into its two components (dividend and divisor), we can update the corresponding dividend (while retaining its divisor) depending on the appearance of extreme cases. For normal cases, we assign larger values to the dividend and the corresponding aspect can be higher weighted. We decrease the dividend the more extreme the case becomes, in order to decrease the effect of the aspect on the total result. The information that indicates whether a case is extreme or normal (or something in between) can be derived from the bounding box information stored in the aspects $a_1, a_2, a_3$ (and $a_4, a_5, a_6$ for the rotated case). The basic idea is that the dividends (Y) can be calculated with a linear equation of the form:

$$Y = \max(0, \min(100, b + g(X-a)))$$

where g is the equation's gradient and $[a,b], (0 > a \leq 100, 0 \leq b \leq 100)$ the center of rotation (for varying gradients). These three parameters let us describe the appearance (or better, the degree) of extreme cases and how to weight derived aspects. Note that we must apply the original equation, or its reflection at X=50, depending on the behavior of the bounding box aspects (X).

The original's reflection at (X=50) then is:

$$Y = \max(0, \min(100, b + g((100-a)-X)))$$

with its center of rotation at [(100−a),b] (for varying gradients). Experimentally, we choose [a,b]=[20,20] with a gradient of g=3. Thus, we can dynamically calculate new dividends for the critical aspects $a_7$–$a_{18}$ and $a_{25}$–$a_{27}$ while the weights for all the other aspects remain constant:

$$\text{Dividend}_{8,11,14,26} = \max(0, \min(100, 20 + 3(a_2 - 20)))$$

$$\text{Dividend}_{7,10,13,25} = \max(0, \min(100, 20 + 3(80 - a_1)))$$

$$\text{Dividend}_{9,12,15,27} = \max(0, \min(100, 20 + 3(a_3 - 20)))$$

And similarly, for the rotated stroke. Note that in our example, the divisors of the critical aspects are 20 and that all weights range from 0 (no effect) to 5 (very strong aspect).

Teaching and Learning Strokes

Learning new strokes is achieved by simply adding a new product rule (i.e. the specific set of aspects) to the knowledge base. From then on, the rule is compared with other, new strokes. Several product rules for the same stroke can be stored (in different representations) to increase the reliability. The system can, for example, be trained by correcting it each time it fails to recognize a stroke. In this case, the aspects of the failed stroke can be added to the set again, and so extend the system's knowledge of different representations of the same stroke. The failure rate of the system decreases as it becomes more knowledgeable about the strokes (i.e. if many different representations of the same strokes are stored in the knowledge base). Similar strokes (strokes that have similar aspect values) should be taught to the system in a similar way (i.e. same dimensions, etc.) to emphasize details. Because the amount of memory required to represent the knowledge base is minimal, a scanned stroke can be recognized very quickly (i.e. the comparison process is very effective), even if the knowledge base contains many different representations of the same strokes. Each aspect ranges from 0 to 100, thus a 7-bit representation is sufficient. Multiplied by 56 (for 56 position/orientation aspects), a stroke representation requires less than 50 bytes of memory, no matter how the stroke is. Even smaller representations can be used, if smaller aspects are sufficient enough (e.g. for 2D or 3D recognition).

In a preferred embodiment, stroke recognition is further enhanced with additional techniques known to the art. These are: feed-forward perceptron neural networks for classification, as described in D. Rumelhart, D. Zipser. "Feature Discovery by Competitive Learning", *Parallel Distributed Processing*, MIT Press, Cambridge, Mass., USA, 1986; neural networks built from linear associators to perform principle component analysis in terms of reducing the amount of redundancy in the knowledge-base, described in E. Oja. "A Simplified Neuron Model as Principle Component Analyzer", *Journal of Mathematical Biology*, vol. 15, pp. 267–273, 1982, and in: T. Sanger. "Optimal Unsupervised Learning in a Single-Layer Linear Feed-forward Neural Network", *Neural Networks* 2, pp. 459–473, 1989.

Figure 17:
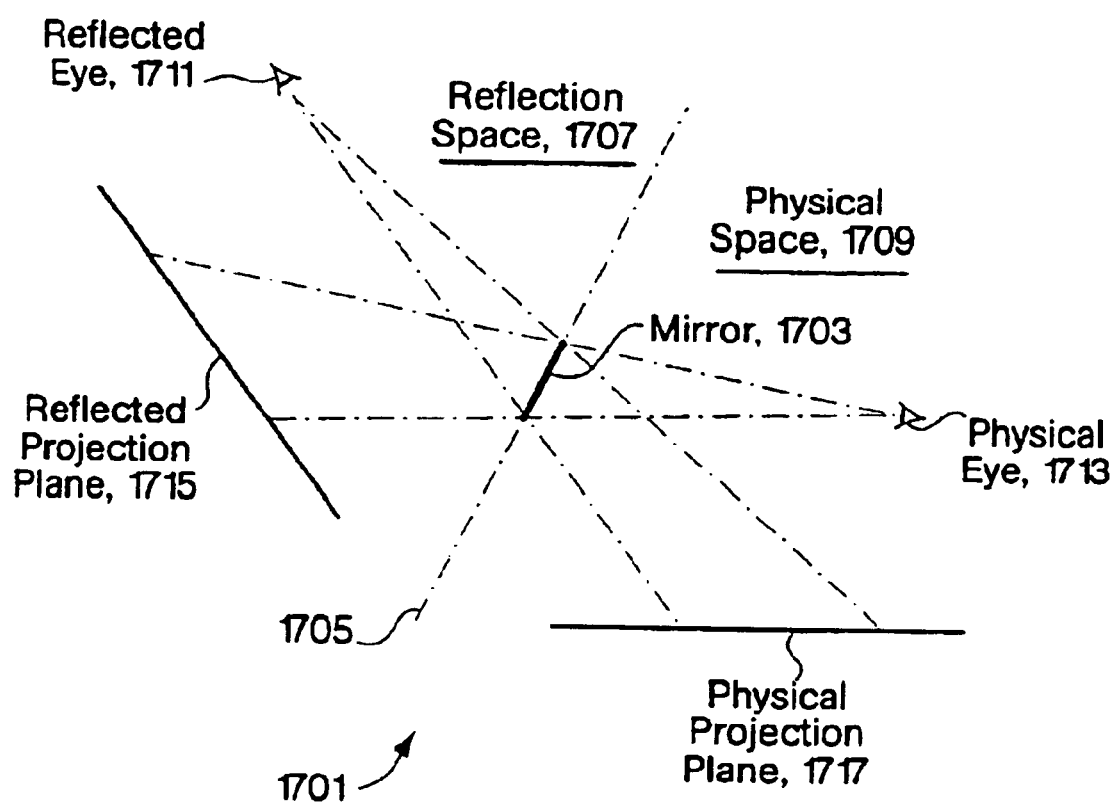
FIG. 17 shows how the portion of the virtual environment that is reflected in a mirror is determined.
Figure 18:
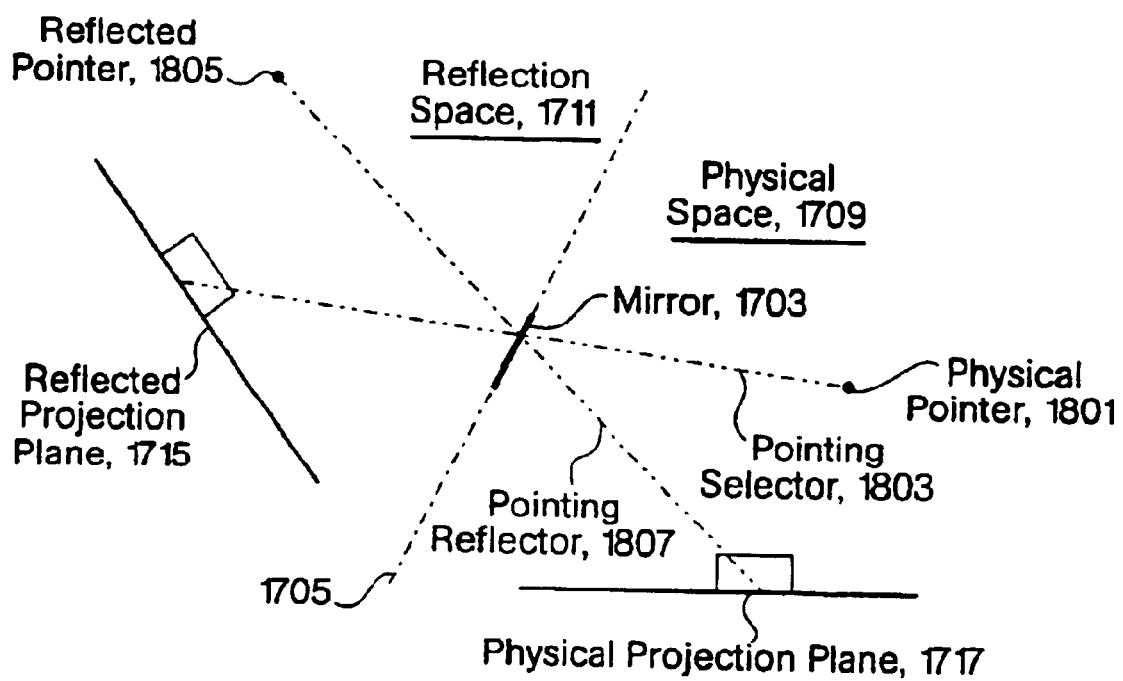
FIG. 18 shows how ray pointing devices may be used with a mirror to manipulate a virtual environment reflected in the mirror.

Since gestures may be defined as sets of strokes, stroke information as recognized above can be used in many ways to interact with virtual environments on an intuitive and natural basis. As shown in the preferred embodiment, motion-based strokes may be used for gestures representing letters and numbers, gestures representing objects in the virtual environment, and gestures for performing operations in the virtual environment Disambiguation of gestures is made easier in a preferred embodiment by the fact that the gestures are made on pad 123 within a precisely-defined context (supplied by pad image 125). As demonstrated in system 101, gestures can be easily combined with other techniques of interaction such as manipulation of buttons or sliders and direct manipulation of objects in the virtual environment. Additional means of interaction could be used as well, for example, simple voice commands for changing modes or for indicating approval or disapproval of responses made by the virtual environment Using Real Mirrors to Reflect Virtual Environments: FIGS. 17 and 18

As indicated in the discussion of the mirror tool above, the mirror tool is a special application of a general technique for using mirrors to view virtual environments. Head tracking, as achieved for example in the preferred embodiment of system 101 by attaching a magnetic tracker to shutter glasses 117, represents one of the most common, and most intuitive methods for navigating within immersive or semi-immersive virtual environments. Back-screen-projection planes are widely employed in industry and the R&D community in the form of virtual tables or responsive workbenches, virtual walls or powerwalls, or even surround-screen projection systems or CAVEs. Applying head-tracking while working with such devices can, however, lead to an unnatural clipping of objects at the edges of projection plane 111. Such clipping destroys the sense of immersion into the virtual scene and is in consequence a fundamental problem of these environments. Standard techniques for overcoming this problem include panning and scaling techniques (triggered by pinch gestures) that reduce the projected scene to a manageable size. However, these techniques do not work well when the viewpoint of the user of the virtual environment is continually changing.

To address these problems we have developed a navigation method called mirror tracking that is complementary to single-user head tracking. The method employs a planar mirror to reflect the virtual environment and can be used to increase the perceived viewing volume of the virtual environment and to permit multiple observers to simultaneously gain a perspectively correct impression of the virtual environment.

The method is based on the fact that a planar mirror enables us to perceive the reflection of stereoscopically projected virtual scenes three-dimensionally. Instead of computing the stereo images that are projected onto surface 111 on the basis of the positions of the user's physical eyes (as it is usually done for head tracking), the stereo images that are projected onto the portion of surface 111 that is reflected in the planar mirror must be computed on the basis of the positions of the reflection of the user's eyes in the reflection space (i.e. the space behind the mirror plane). Because of the symmetry between the real world and its reflected image, the physical eyes perceive the same perspective by looking from the physical space through the mirror plane into the reflection space, as the reflected eyes do by looking from the reflection space through the mirror plane into the physical space. This is shown at 1701 in FIG. 17. Mirror 1703 defines a plane 1705 which divides what a user's physical eye 1713 sees into two spaces: physical space 1709, to which physical eye 1713 and physical projection plane 1717 belong, and reflection space 1707, to which reflection 1711 of physical eye 1713 and reflection 1715 of physical projection plane 1717 appear to belong when reflected in mirror 1703. Because reflection space 1707 and physical space 1709 are symmetrical, the portion of the virtual environment that physical eye 1713 sees in mirror 1703 is the portion of the virtual environment that reflected eye 1711 would see if it were looking through mirror 1703.

Thus in order to determine the portion of physical projection plane 1717 that will be reflected to physical eye 1713 in mirror 1703 and the point of view from which physical eye 1713 will see the virtual reality projected on that portion of physical projection plane 1716, virtual reality system program 109 need only know the position and orientation of physical eye 1713 and the size and position of mirror 1703. Using this information, virtual reality system program 109 can determine the position and orientation of reflected eye 1711 in reflected space 1707 and from that, the portion of physical projection plane 1717 that will be reflected and the point of view which determines the virtual environment to be produced on that portion of physical projection plane 1717.

If mirror plane 1705 is represented as:

$$f(x,y,z)=ax+by+cz+d=0,$$

with its normal vector $\overline{N}=[a,b,c]$
then the reflection of a point (in physical space coordinates) can be calculated as follows:

$$\overline{P} = \overline{P} - \frac{2}{(\overline{N}^2)}(\overline{N}\overline{P}+d)\overline{N}.$$

where $\overline{P}$ is the physical point and $\overline{P}$ its reflection. To make use of the binocular parallax, the reflections of both eyes have to be determined. In contrast to head tracking, the positions of the reflected eyes are used to compute the stereo images, rather than the physical eyes.

We can apply the reflection theorem to compute a vector's reflector:

$$\vec{L}=2(\overline{NL})\overline{N}-\overline{L},$$

where $\vec{L}$ is the reflector of L.
If $\overline{E}$ is the user's generalized physical eye position and $\overline{x}$ a visible point on the mirror plane, then $$\overline{L} = \frac{\overline{E}-\overline{X}}{|\overline{E}-\overline{X}|}.$$

Hence, we can compute the visible points that are projected onto physical projection plane 1717 (g(x,y,z)=0) and are reflected by mirror plane 1705 (f(x,y,z)=0) as follows:

$$R=\{\overline{Y}|\overline{Y}=\overline{X}+\lambda\vec{L}, g(\overline{Y})=0, f(\overline{X})=0$$

where $\overline{X}$ is the point on the mirror plane that is visible to the user, and Y is the point on the projection plane that is reflected towards the user at $\overline{X}$.

Uses of Mirrors in Viewing Virtual Environments

We have already seen how transparent pad 123 may be made reflective and may be used in its reflective mode to view a virtual environment in the manner just described. All that is required to use any reflective surface to view a virtual environment is that virtual reality system program 109 know the shape, location, and orientation of the mirror and the location and orientation of physical eyes 1713 that are using the mirror to view the virtual environment.

Hand-Held Mirrors

One way of using such mirrors is as hand-held mirrors. Such a hand-held mirror can be used to view the virtual reality from inspection points that are difficult to reach. Because mirror tracking permits virtual reality system program 109 to adjust what is projected on the portion of physical projection plane 1717 that is reflected in mirror 1703 as required for both the position and orientation of mirror 1703 and the position and orientation of physical eye 1713, mirror tracking allows us to observe unnaturally clipped areas intuitively, even when the observer's viewpoint is changing continuously. The mirror itself can also be used as clipping plane that enables us to investigate the interiors of objects:

$$f(x,t,x)\Delta$$

where $\Delta$ is the clipping plane offset. The offset is particularly useful to reflect the intersection in the mirror. Mirror tracking and head tracking are complementary. To switch from head tracking to mirror tracking, all the user need to is look at a mirror that is in a position where what the user will see in the mirror is a reflection of a portion of projection plane 1717. If the user is holding the mirror, the user can manipulate it until it is in the proper position. To return to head tracking, all the user has to do is cease looking into the mirror. If the mirror is hand-held, the user can simply lay it down.

Using Mirrors to Permit Group Observations of a Virtual Environment

By presuming that the physical and the reflected eyes are always located at constant positions and orientations relative to mirror plane 1705(e.g. on the mirror plane), we can do mirror tracking simply by tracking the mirror. Even though this approximation does not result in a mirrored perspective that is absolutely correct for each observer viewing the mirror, it does allow multiple observers to view the virtual environment simultaneously by means of the mirror. By moving the mirror, different portions of the virtual environment may be displayed to all of those looking at the mirror.

The perspective seen by the observers can be thought of as the perspective two stereo-cameras would capture from eye positions that are kept constant relative to the mirror-plane. Everyone looking at the mirror can then observe this perspective.

Of course, only observers whose eye positions matched the constant eye positions would perceive an undistorted stereoscopic impression. We found, however, that a satisfactory stereoscopic impression can still be perceived by viewers who take up obtuse-angled lines of vision with regard to relatively small mirrors.

Techniques that compute the best average viewpoint for a group of people create similar problems. The closer a single observer is to the average viewpoint, the less distorted is his view; the more compact the group is clustered, the lower the stereoscopic and perspective error for every single observer.

The following observations can be made concerning using mirrors to enable a group of observers to view a virtual environment:

- The perspective of the image that is visible in the mirror is always approximately correct for all observers, since it depends only on the mirror (camera-display paradigm) and not on a single user.
- Relatively small mirrors force the observers to cluster together, in order to look simultaneously at the mirror-plane. This keeps the individual stereoscopic error low.
- Coordination problems that arise out of simultaneous navigation with the whole group are handled by reorienting the mirror, instead of the moving the group. This keeps the group clustered and the individual stereoscopic error remains low.
- Navigation control can be intuitively delegated to another person by simply handing over the mirror.
- As it is the case for single users, mirror-tracking also enables a group to increase its viewing volume in the environment.

Interacting with Reflection Space 1707

Our mirror-interaction paradigm supports indirect manipulative metaphors using ray pointers (e.g. ray casing, gaze directed interaction and pointing). The location and orientation of such pointing devices are provided to system 109,. As shown in FIG. 18, pointing selector 1803 produced by physical pointer 1801 must be directed at the location of interest in the reflection in mirror 1703. System 109 computes the location and orientation in reflection space 1711 of a reflected pointer 1805 and from that, pointing reflector 1807. The location in physical projection plane 1717 specified by pointing reflector 1807 is the selected location. FIG. 18 shows the geometric and computational basis for all ray-pointing interactions with reflection space 1711. Note that direct manipulation (such as virtual hands, direct picking) of the reflections is not possible because of the physical constraints of mirror 1703.

Figure 21:
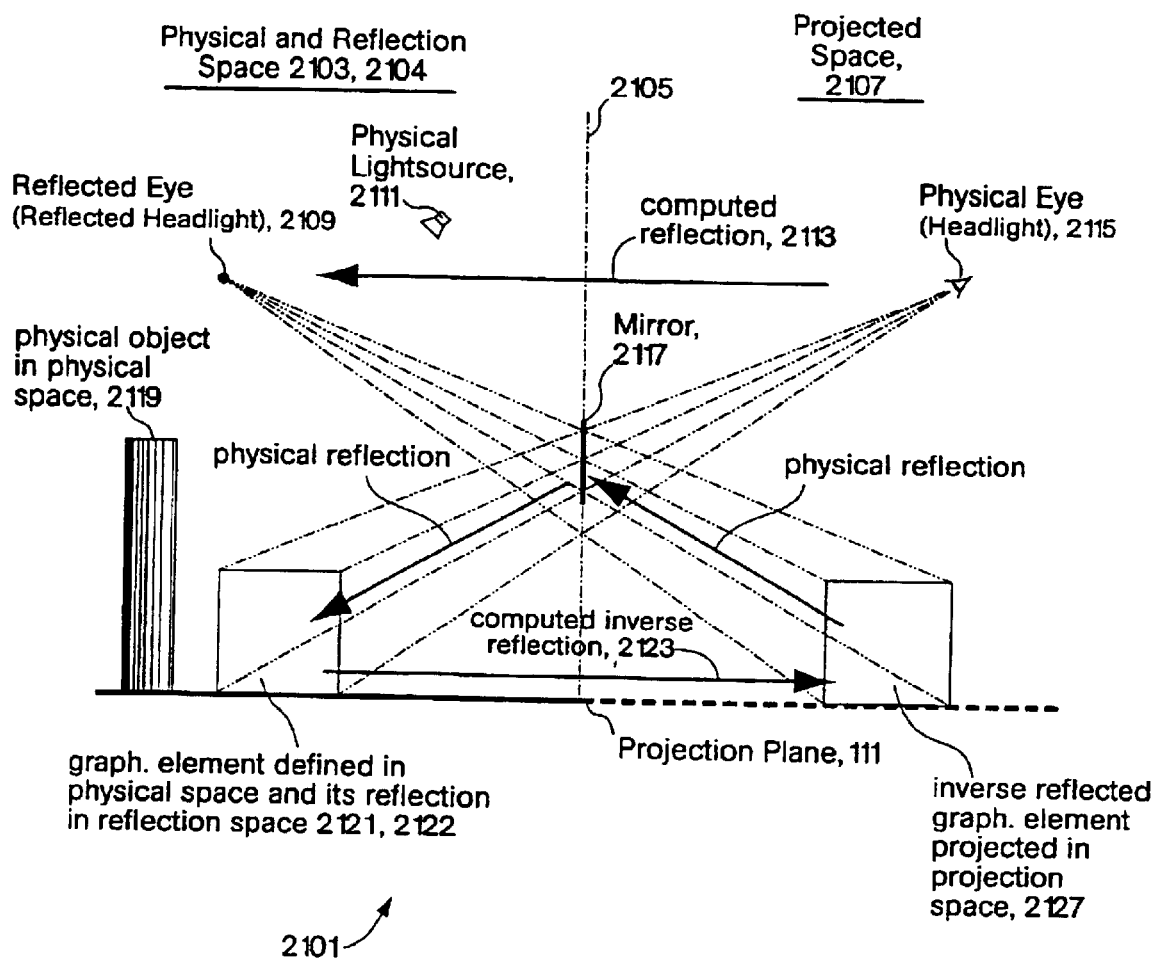
FIG. 21 shows how a transflective panel may be used with a virtual environment to produce reflections of virtual objects that appear to belong to a physical space.
Figure 22:
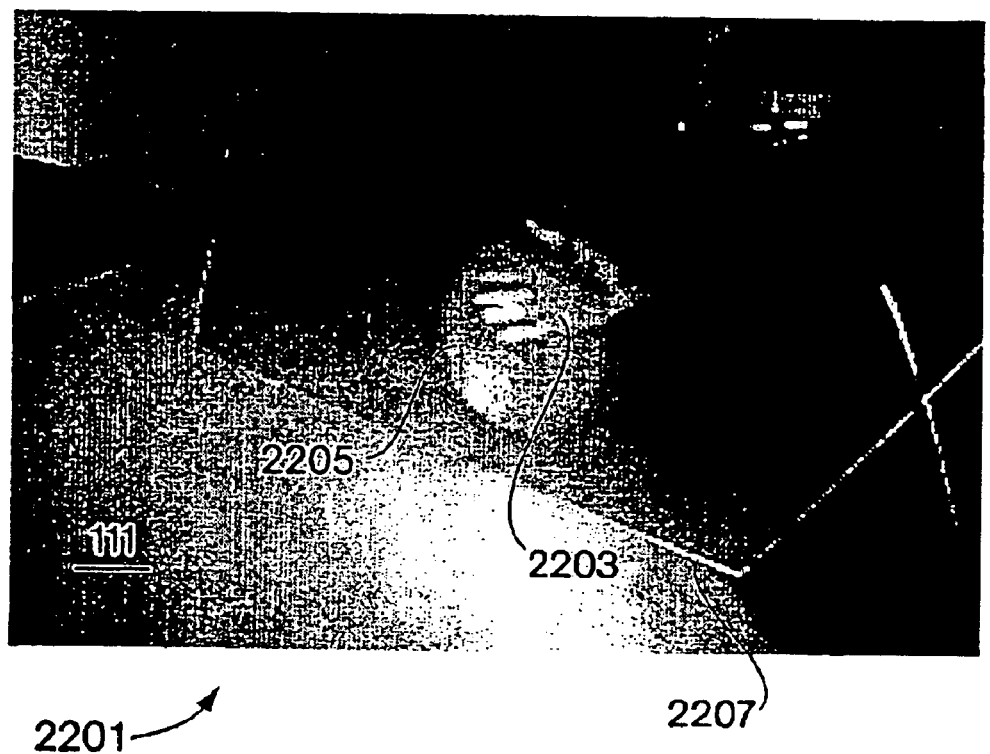
FIG. 22 shows how the transflective panel may be used to prevent a virtual object from being occluded by a physical object.
Figure 23:
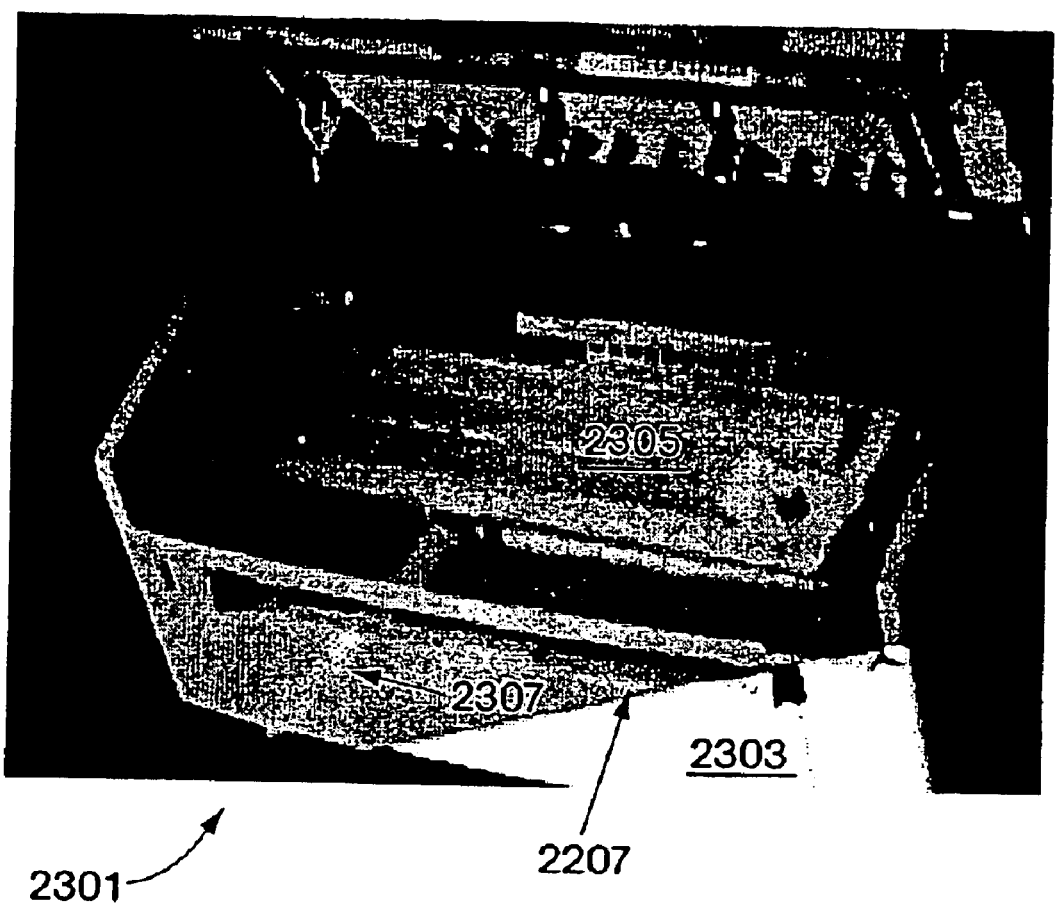
FIG. 23 shows how the transflective panel may be used to augment a physical object with a virtual object.

Using Transflective Tools with Virtual Environments: FIGS. 21–23

When the reflecting pad is made using a clear panel and film such as Scotchtint P-18, it is able not only to alternatively transmit light and reflect light, but also able to do both simultaneously, that is, to operate transflectively. A pad with this capability can be used to augment the image of a physical object seen through the clear panel by means of virtual objects produced on projection plane 111 and reflected by the transflective pad. This will be described with regard to FIG. 21.

In FIG. 21, the plane of transflective pad 2117 divides environment 2101 into two subspaces. We will call subspace 2107 that contains the viewer's physical eyes 2115 and (at least a large portion of) projection plane 111 'the projection space' (or PRS), and subspace 2103 that contains physical object 2119 and additional physical light-sources 2111 'the physical space' (or PHS). Also defined in physical space, but not actually present there, is virtual graphical element 2121. PHS 2103 is exactly overlaid by reflection space 2104, which is the space that physical eye 2115 sees reflected in mirror 2117. The objects that physical eye 2115 sees reflected in mirror 2117 are virtual objects that the virtual environment system produces on projection plane 111. Here, the virtual environment system uses the definition of virtual graphical element 2121 to produce virtual graphical element 2127 at a location and orientation on projection plane 111 such that when element 2127 is reflected in mirror 2117, the reflection 2122 of virtual graphical element 2127 appears in reflection space 2104 at the location of virtual graphical element 2121. Since mirror 2117 is transflective, physical eye 2115 can see both physical object 2119 through mirror 2117 and virtual graphical element 2127 reflected in mirror 2117 and consequently, reflected graphical element 2122 appears to physical eye 2115 to overlay physical object 2119.

We apply stereoscopic viewing and head-tracking to virtual graphical element 2127 projected onto projection plane 111, thus all graphical elements (geometry, virtual light-sources, clipping-planes, normals, etc) are defined in the virtual scene. The exact overlay of physical space 2103 and reflection space 2104 is achieved by providing the virtual environment system with the location and orientation of physical object 2119, the definition of graphical element 2121, the location and orientation of mirror 2117, and the location and direction of view of physical eye 2115. Using this information, the virtual environment system can compute projection space 2107 as shown by arrows 2113 and 2123. The virtual environment system computes the location and direction of view of reflected eye 2109 from the location and direction of view of physical eye 2115 and the location and orientation of mirror 2117 (as shown by arrow 2113). The virtual environment system computes the location of inverse reflected virtual graphical element 2127 in projection space 2107 from the location and point of view of reflected eye 2109, the location and orientation of mirror 2117, and the definition of virtual graphical element 2121, as shown by arrow 2123. In general, the definition of virtual graphical element 2121 will be relative to the position and orientation of physical object 2119. The virtual environment system then produces inverse reflected virtual graphical element 2127 on projection plane 111, which is then reflected to physical eye 2115 by mirror 2117. Since reflection space 2104 exactly overlays physical space 2103, the reflection 2122 of virtual graphical element 2127 exactly overlays defined graphical element 2121. In a preferred embodiment, physical object 2119 has a tracking device and a spoken command is used to indicate to the virtual environment system that the current location and orientation of physical object 2119 are to be registered in the coordinate system of the virtual environment being projected onto projection plane 111. Since graphical element 2121 is defined relative to physical object 2119, registration of physical object 2119 also defines the location and orientation of graphical element 2121. In other embodiments, of course, physical object 2119 may be continually tracked.

The technique described above can be used to augment a physical object 2119 in PHS 2103 with additional graphical elements 2127 that are produced on projection plane 111 and reflected in transflective mirror 2117 so that they appear to physical eye 2115 to be in the neighborhood of physical object 2119, as shown at 2121. Transflective mirror 2117 thus solves an important problem of back-projection environments, namely that the presence of physical objects in PRS 2107 occludes the virtual environment produced on projection plane 111 and thereby destroys the stereoscopic illusion. When the above technique is used, the virtual elements will always overlay the physical objects.

More precisely, if we compute (arrow 2113) the reflection of physical eye 2115 in mirror 2117 to obtain reflected eye 2109 (as well as possible virtual head-lights) and apply the inverse reflection 2123 to every virtual element 2121 that is to appear in PHS 2103, virtual element 2121 gets projected at 2127, its corresponding inverse reflected position within PRS 2107, and physically reflected back by mirror 2117 so that it appears to physical eye 2115 to be in reflection space 2104. Since, in this case, reflection space 2104 exactly overlays PHS 2103, the reflected virtual element 2127 will appear at the same position (2122) within the reflection space as virtual element 2121 would occupy within PHS 2103 if virtual element 2121 were real and PHS 2103 were being viewed by physical eye 2115 without mirror 2117.

FIG. 22 illustrates a simple first example at 2201. A virtual sphere 2205 is produced on projection plane 111. If hand 2203 is held between the viewer's eyes and projection plane 111, hand 2203 occludes sphere 2205. If transflective mirror 2207 is placed between hand 2203 and the viewer's eyes in the proper position, the virtual environment system will use the position of transflective mirror 2207, the original position of sphere 2205 on projection plane 111, and the position of the viewer's eyes to produce a new virtual sphere at a position on projection plane 111 such that when the viewer looks at transflective mirror 2207 the reflection of the new virtual sphere in mirror 2207 appears to the viewer to occupy the same position as the original virtual sphere 2205; however, since mirror 2207 is in front of hand 2203, hand 2203 cannot occlude virtual sphere 2205 and virtual sphere 2205 overlays hand 2203.

The user can intuitively adjust the ratio between transparency and the reflectivity by changing the angle between transflective mirror 2207 and projection plane 111. While acute angles highlight the virtual augmentation, obtuse angles let the physical objects show through brighter. As for most augmented environments, a proper illumination is decisive for a good quality. The technique would of course also work with fixed transflective mirrors 2207.

FIG. 23 shows an example of how a transflective mirror might be used to augment a transmitted image. Here, physical object 2119 is a printer 2303. Printer 2303's physical cartridge has been removed. Graphical element 2123 is a virtual representation 2305 of the printer's cartridge which is produced on projection plane 111 and reflected in transflective mirror 2207. Printer 2303 was registered in the coordinate system of the virtual environment and the virtual environment system computed reflection space 2104 as described above so that it exactly overlays physical space 2103. Thus, virtual representation 2305 appears to be inside printer 2303 when printer 2303 is viewed through transflective mirror 2207. Because virtual representation 2305 is generated on projection plane 111 according to the positions of printer 2303, physical eye 2115, and mirror 2117, mirror 2117 can be moved by the user and the virtual cartridge will always appear inside printer 2303. Virtual arrow 2307, which shows the direction in which the printer's cartridge must be moved to remove it from printer 2303 is another example of augmentation. Like the virtual cartridge, it is produced on projection plane 111. Of course, with this technique, anything which can be produced on projection plane 111 can be use to augment a real object.

To create reflection space 2104, the normal/inverse reflection must be applied to every aspect of graphical element 2127, including vertices, normals, clipping planes, textures, light sources, etc., as well as to the physical eye position and virtual head-lights. Since these elements are usually difficult to access, hidden below some internal data-structure (generation-functions, scene-graphs, etc.), and an iterative transformation would be to time-intensive, we can express the reflection as a 4×4 transformation matrix. Note, that this complex transformation cannot be approximated with an accumulation of basic transformations (such as translation, rotation and scaling).

Let $f(x, y, z)=ax+by+cz+d$ be the mirror-plane, with its normal $\overline{N}=[a,b,c]$ and its offset d. Then the reflection matrix is:

$$M = \frac{1}{\overline{N}^2}\begin{bmatrix} b^2+c^2-a^2 & -2ab & -2ac & -2ad \\ -2ab & a^2+c^2-b^2 & -2bc & -2bd \\ -2ac & -2bc & a^2+b^2-c^2 & -2cd \\ 0 & 0 & 0 & \overline{N}^2 \end{bmatrix}$$

By applying the reflection matrix, every graphical element will be reflected with respect to the mirror-plane. A side-effect of this is, that the order of polygons will also be reverse (e.g. from counterclockwise to clockwise) which, due to the wrong front-face determination, results in a wrong rendering (e.g. lighting, culling, etc.). This can easily be solved by explicitly reversing the polygon order.

How this is done is shown in the following example in source code that uses the OpenGL graphical API. Details of this API may be found at www.opengl.org.

```
...
glFrontFace(GL_CW);      // set polygon order to clockwise
                         // (OpenGL default: counterclockwise)
glPushMatrix( );         // backup current transformation matrix
glMultMatrixd( M );      // apply reflection matrix
renderEverything( );     // render all graphical elements that have to
                         // be reflected (with respect to reflected eye
                         // position and reflected headlights)
glPopMatrix( );          // restore transformation matrix
glFrontFace(GL_CCW);     // set polygon order back to default
                         // (counterclockwise)
...
```

Any complex graphical element (normals, material properties, textures, text, clipping planes, light sources, etc.) is reflected by applying the reflection matrix, as shown in the pseudo-code above.

Figure 19:
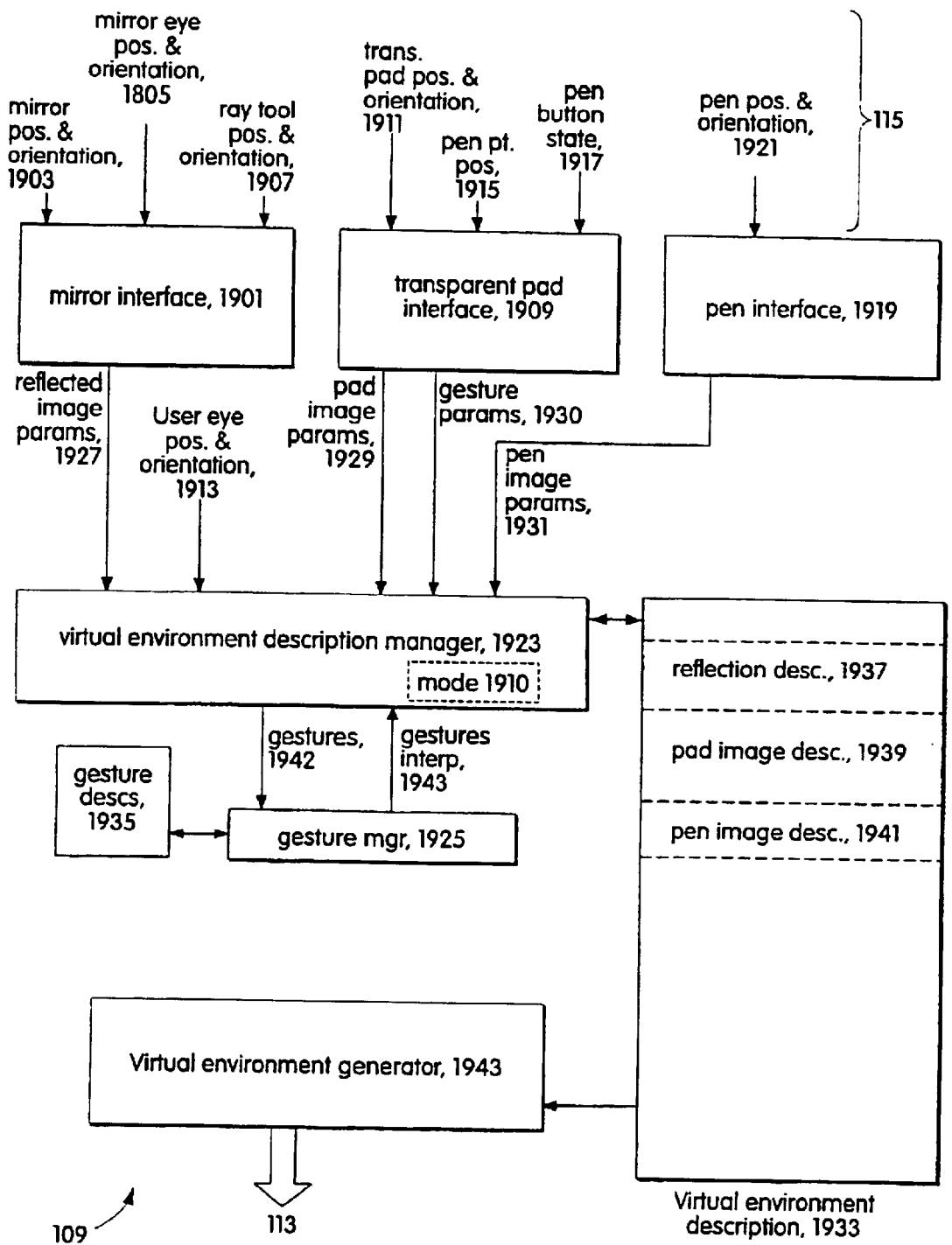
FIG. 19 is an overview of virtual reality system program 109.

Overview of Virtual Reality System Program 109: FIG. 19

Virtual reality system program 109 in system 101 is able to deal with inputs of the user's eye positions and locations together with position and orientation inputs from transparent pad 123 to make pad image 125, with position and orientation inputs from pen 121 to make projected pen 127, with inputs from pen 121 as applied to pad 123 to perform operations on the virtual environment, and together with position and orientation inputs from a mirror to operate on the virtual environment so that the mirror reflects the virtual environment appropriately for the mirror's position and orientation and the eye positions. All of these inputs are shown at 115 of FIG. 1. As also shown at 113 in FIG. 1, the resulting virtual environment is output to virtual table 111.

FIG. 19 provides an overview of major components of program 109 and their interaction with each other. The information needed to produce a virtual environment is contained in virtual environment description 1933 in memory 107. To produce the virtual environment on virtual table 111, virtual environment generator 1943 reads data from virtual environment description 1933 and makes stereoscopic images from it Those images are output via 113 for back projection on table surface 111. Pad image 125 and pen image 127 are part of the virtual environment, as is the portion of the virtual environment reflected by the mirror, and consequently, virtual environment description 1933 contains a description of a reflection (1937), a description of the pad image (1939), and a description of the pen image (1941).

Virtual environment description 1933 is maintained by virtual environment description manager 1923 in response to parameters 1913 indicating the current position and orientation of the user's eyes, parameters 1927, 1929, 1930, and 1931 from the interfaces for the mirror (1901), the transparent pad (1909), and the pen (1919), and the current mode of operation of the mirror and/or pad and pen, as indicated in mode specifier 1910. Mirror interface 1901 receives mirror position and orientation information 1903 from the mirror, eye position and orientation information 1805 for the mirror's viewer, and if a ray tool is being used, ray tool position and orientation information 1907. Mirror interface 1901 interprets this information to determine the parameters that virtual environment description manager 1923 requires to make the image to be reflected in the mirror appear at the proper point in the virtual environment and provides the parameters (1927) to manager 1923, which produces or modifies reflection description 1937 as required by the parameters and the current value of mode 1910. Changes in mirror position and orientation 1903 may of course also cause mirror interface 1901 to provide a parameter to which manager 1923 responds by changing the value of mode 1910.

The other interfaces work in much the same fashion. Transparent pad interface 1909 receives position and orientation information 1911 from transparent pad 123, the position 1915 of the point of pen 121, and the state 1917 of pen 121's button and interprets this information to provide pad image parameters 1929 to virtual environment description manager 1923 which manager 1923 can interpret to determine the part of the virtual environment upon which pad mage 125 is to appear and the mode of appearance of pad image 125. Where gestures are involved, the pad image parameters 1929 specify the gestures and the pen strokes that make them up. Virtual environment description manager passes the gesture and pen stroke specifications to gesture manager 1925, which uses gesture descriptions 1935 to interpret them and return the results of the interpretation to manager 1923. If transparent pad 123 is operating in gesture learning mode, gesture manager 1925 adds descriptions of the gestures and their meanings to gesture descriptions 1935. Pen interface 1919 provides the information to manager 1923 which manager 1923 needs to make projected pen 127.

CONCLUSION

The foregoing Detailed Description has disclosed the best mode presently known to the inventors of implementing their techniques for making tools for use in virtual environments that are themselves part of the virtual environment. It will however be immediately apparent to those skilled in the arts to which the techniques pertain that the principles of the techniques may be implemented in many other ways. For example, the device that is used to view the portion of the virtual environment to be modified may be the mirror or transparent panel used in the preferred embodiment, but may also be any other device which can be used to view a portion of the virtual environment. One example of such a device is a simple wire frame. Another is a touch-sensitive transparent tablet. A device that is both reflective and transparent may be implemented as described in the preferred embodiment or using any other technique, for example, a panel that becomes reflective or transparent in response to electrical inputs. The transflective panel can be used as described to augment real objects or to deal with occlusion of virtual objects by real objects, but can also be used generally where it is useful to introduce a virtual object into an environment seen through the transflective panel. Where a tool is always transparent, the tool can be can be reduced to a handle, with the image of the tool being computed from the position and location of the user's eyes, the position and orientation of the handle, and parameters defining the tool's type and size.

It will also be apparent that the portion may be modified in any way which is useful for the particular task or virtual environment and may include any kind of object which is useful for the particular task or virtual environment. The tools are consequently completely polymorphic. While the transparent stylus of the preferred embodiment is a particularly useful kind of selection tool when used in conjunction with the invention, any other kind of selection tool which can operate on the portion may also be employed. Mode and operation specification inputs may be the position, button selection, and gesture inputs described herein, but also any other kind of user input that the virtual environment will accept, for example voice input.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A virtual environment system of a type that produces a virtual environment in a display, the virtual environment being produced in the display as seen from a given direction and point of view and
the virtual environment system having the improvement comprising:
   a device that is separate from the display, is used to view a portion of the display from the given direction and point of view, and whose position and orientation are received by the virtual environment system together with the given direction and point of view; and
   the virtual environment system responding to the device position and orientation and to the given direction and point of view to produce a modification of the virtual environment in the portion of the display that is viewed using the device.

2. The virtual environment system set forth in claim 1 wherein:
   the device reflects the portion of the display when viewed from the given direction and point of view.

3. The virtual environment system set forth in claim 2 wherein:
   the device has a plurality of reflective surfaces; and
   the modification produced by the virtual environment system varies with the reflective surface that is reflecting the portion.

4. The virtual environment system set forth in claim 2 wherein:
   the virtual environment system responds to the device position and orientation and to the given direction and point of view to determine a second direction and point of view which the virtual environment system uses with the device position and orientation; and
   the modification of the virtual environment in the portion is the virtual environment as seen from the second direction and point of view.

5. The virtual environment system set forth in claim 4 wherein:
   the second direction and point of view is that which the reflection of the given direction and point of view in the device appears to have.

6. The virtual environment system set forth in claim 5 wherein:
   the virtual environment in the portion differs from the virtual environment outside the portion in more than being seen from the second point of view, whereby the virtual environment in the portion operates as a magic lens in the virtual environment.

7. The virtual environment system set forth in claim 2 further comprising:
   a ray tool that produces a ray for selecting a location in the virtual environment, the ray tool's position and orientation being received in the virtual environment, and
   the virtual environment responding when the ray tool's position and orientation relative to the device is such that a reflection of the ray from the device falls within the virtual environment in the portion of the display that is reflected in the device by selecting the location in the virtual environment upon which the reflection of the ray falls.

8. The virtual environment system set forth in claim 1 wherein:
   the device is transflective; and
   the portion of the display is located relative to the device such that the modification of the virtual environment in the portion is reflected in the device when the device is seen from the given direction and point of view,
whereby the reflection of the modification is seen together with an object that is seen through the device.

9. The virtual environment system set forth in claim 8 wherein:
   the virtual environment system further responds to the location of the object by locating the portion of the display such that the reflection of the modification of the virtual environment appears to be at a predetermined location relative to the object seen through the device.

10. The virtual environment system set forth in claim 9 wherein:
   the object seen through the device is a virtual object;
   the apparent location of the reflection of the object is that of the virtual object; and
   the modification of the virtual environment in the portion is identical in appearance to the virtual object,
whereby the reflection of the modification appears to overlay an object that occludes the virtual object.

11. The virtual environment system set forth in claim 9 wherein:
   the object seen through the device is a real object; and
the modification of the portion of the virtual environment is an augmentation of the real object.

12. The virtual environment system set forth in claim 1 wherein:
   the portion of the display is viewed through the device.

13. The virtual environment system set forth in claim 12 wherein:
   the device has at least two sides; and
   the modification of the virtual environment produced by the virtual environment system in the portion depends on which side of the device is being seen from the given direction and point of view.

14. The virtual environment system set forth in claim 12 wherein:
   the virtual environment system produces the modification of the virtual environment such that the portion has the appearance of being viewed through a transparent panel having the orientation of the device.

15. The virtual environment system set forth in claim 14 wherein:
   the virtual environment system further alters the modification of the virtual environment depending on an object in the virtual environment which has the appearance of being viewed through the transparent panel,
whereby the modification is made context-sensitive.

16. The virtual environment system set forth in claim 12 wherein:
   when an object is in the portion, the object is subject to manipulation.

17. The virtual environment system set forth in claim 12 wherein:
   the device is movable by a user; and
   an object that is in a volume of the virtual environment through which the device appears to sweep is thereby selected for manipulation.

18. The virtual environment system set forth in claim 12 wherein:
   the device is movable by the user;
   the virtual environment system further receives one or more mode inputs; and
   the virtual environment system responds to a first mode input by binding a copy of an item in the virtual environment in the portion currently being viewed through the device to the device, whereby the copy becomes separate from the copied item and the virtual environment in the portion includes the copy.

19. The virtual environment system set forth in claim 18 wherein:
   the virtual environment system responds to a second mode input by unbinding the copy from the device, the copy remaining in the virtual environment at the point where the copy was unbound.

20. The virtual environment system set forth in claim 19 wherein:
   the virtual environment system responds to a third mode input by in the alternative binding the copy to the copied portion, so that a change in either the copy or the copied portion also takes place in the other or unbinding the copy from the copied portion, so that a change in either the copy or the copied portion does not affect the other.

21. The virtual environment system set forth in claim 12 wherein:
   the device is movable and
   the virtual environment in the portion includes one or more objects that move with the device.

22. The virtual environment system set forth in claim 21 further comprising:
    a selection device that is separate from the display and movable independently of the device and that is capable of selecting objects in the virtual environment in the portion or elsewhere in the virtual environment.

23. The virtual environment system set forth in claim 22 wherein:
    the selection device selects an object in the virtual environment in the portion for placement elsewhere in the virtual environment.

24. The virtual environment system set forth in claim 22 wherein:
    the selection device selects an object elsewhere in the virtual environment for placement in the virtual environment in the portion.

25. The virtual environment system set forth in claim 22 wherein:
    the object in the virtual environment in the portion represents an operation; and
    the virtual environment system responds to a selection of the object by the selection device by performing the operation represented by the object.

26. The virtual environment system set forth in claim 25 wherein:
    the selection device is a transparent device whose position and orientation are received by the virtual environment system; and
    the virtual environment system responds to the position and orientation of the selection device and to the given direction and point of view to produce an image of the selection device in the virtual environment in the portion of the display viewed through the selection device.

27. The virtual environment system set forth in claim 26 wherein:
    the image of the selection device includes a visual representation of the specified operation.

28. The virtual environment system set forth in claim 25 wherein:
    the virtual environment system produces a plurality of types of modifications of the virtual environment; and
    the specified operation is producing another type of modification.

29. The virtual environment system set forth in claim 25 wherein:
    the specified operation is modifying a selected object.

30. The virtual environment system set forth in claim 29 wherein:
    There is a plurality of objects that specify operations; and
    the objects in the virtual environment in the portion vary according to the selected object.

31. The virtual environment system set forth in claim 30 wherein:
    the objects in the virtual environment in the portion further vary according to a previously-selected operation.

32. The virtual environment system set forth in claim 25 wherein:
    the object is a button that is activated by placing the image of the selection device within the confines of the button.

33. The virtual environment system set forth in claim 25 wherein:
    the object is a slider that is moved by means of the image of the selection device.

34. The virtual environment system set forth in claim 21 wherein:
    the stylus is transparent; and
    the virtual environment system responds to the position and orientation of the stylus and to the given direction and point of view to produce an image of a stylus in the virtual environment in the portion of the display viewed through the stylus.

35. The virtual environment system set forth in claim 12 wherein:
    the device includes a transparent panel;
    the virtual environment system further includes a stylus, the stylus' position and orientation being received in the virtual environment; and
    when a user of the virtual environment system moves the stylus' end on or near the surface of the transparent panel, the virtual environment system responds thereto by making corresponding marks in the virtual environment in the portion.

36. The virtual environment system set forth in claim 35 further comprising:
    a gesture manager that interprets movements of the stylus' end on or near the surface of the transparent panel as a gesture specifying an operation and provides a specifier for the operation to the virtual environment system, the virtual environment system responding to the specifier by performing the operation.

37. The virtual environment system set forth in claim 36 wherein:
    the gesture indicates creation of a type of object.

38. The virtual environment system set forth in claim 37 wherein:
    the gesture further indicates a size and orientation for the object.

39. The virtual environment system set forth in claim 36 wherein:
    the gesture indicates that a selected object in the portion is to be deleted.

40. The virtual environment system set forth in claim 36 wherein:
    the gesture indicates that a previous operation is to be undone.

41. The virtual environment system set forth in claim 36 wherein:
    the virtual environment system produces a plurality of types of modifications; and the gesture indicates that the type of modification is to be changed.

42. The virtual environment system set forth in claim 36 wherein:
    the gesture indicates that an object in the portion is to be selected.

43. The virtual environment system set forth in claim 36 wherein:
    the gesture indicates a letter or a numeral that is to be input to the virtual environment system.

44. The virtual environment system set forth in claim 36 wherein:
    the gesture manager learns for a gesture the operation specified by the gesture.

45. The virtual environment system set forth in claim 1 wherein:
    depending on the orientation of the device relative to the virtual environment, the device is in the alternative transparent and reflective; and when the orientation of the device indicates that the device is reflective, the virtual environment system responds to the device position and orientation and to the given direction and point of view such that the portion is reflected by the device when the device is viewed from the given direction and point of view; and when the orientation of the device indicates that the device is transparent, the portion is viewed through the device from the given direction and point of view.

46. The virtual environment system set forth in claim 1 wherein:

the given direction and point of view have a fixed relationship to the device.

47. The virtual environment system set forth in claim 46 wherein:

the device is movable relative to the virtual environment.

48. The virtual environment system set forth in claim 1 wherein:

both the device and the given direction and point of view are movable relative to the virtual environment.

49. The virtual environment system set forth in claim 48 wherein:

the virtual environment system produces a plurality of types of modifications; and which type of modification is determined by the orientation of the device.

50. The virtual environment system set forth in claim 48 wherein:

the given direction and point of view are those of a user of the virtual environment system; and the user holds the device in the user's hand.

51. The virtual environment system set forth in claim 1 wherein:

the virtual environment in the portion functions as a magic lens.

52. The virtual environment system set forth in claim 1 wherein:

the device is a transparent panel.

53. The virtual environment system set forth in claim 1 wherein:

the virtual environment system further receives a mode input; and the virtual environment system produces a plurality of types of modifications and which type is produced is determined by the mode input.

54. The virtual environment system set forth in claim 53 wherein:

the types of modifications produced by the virtual environment system include at least a modification that functions as a magic lens into the virtual environment.

55. Apparatus for producing an image of a tool in a virtual environment system of a type that produces a virtual environment in a display, the virtual environment being produced in the display as seen from a given direction and point of view and the apparatus comprising:

a real object that is separate from the display and is held by a user of the virtual environment system, the object including at least a handle and the object's position and orientation being provided to the virtual environment system; and parameters for the tool's image in the virtual environment system, the virtual environment system responding to the given direction and point of view, the parameters, and the object's position and orientation by producing an image of the tool in the virtual environment at a position and orientation therein that corresponds to the position and orientation of the object and the given direction and point of view.

56. The apparatus set forth in claim 55 wherein:

the object further includes a transparent component extending beyond the handle.

57. The apparatus set forth in claim 56 wherein:

the extent of the transparent component corresponds to the extent of the image in the virtual environment.

58. The apparatus set forth in claim 57 wherein:

the apparatus produces images of more than one tool;

each tool has an object corresponding thereto; and when one tool is being used in conjunction with another tool, the transparent component of the one object comes into contact with the transparent component of the other object, whereby the user is provided with tactile feedback.

59. The apparatus set forth in claim 58 wherein:

one of the objects has a planar transparent extent and the image corresponding thereto is a planar surface;

another of the objects has a stylus-like transparent extent and the image corresponding thereto is a stylus; and the user applies the stylus-like transparent extent to the planar transparent extent, whereby the stylus tool performs an operation on the planar surface tool.

60. The apparatus set forth in claim 56 wherein:

the transparent component is a transparent pad.

61. The apparatus set forth in claim 60 wherein:

the image of the tool is a modification of the virtual environment that corresponds to the position and orientation of the transparent pad and the given direction and point of view.

62. The apparatus set forth in claim 55 wherein:

the apparatus produces a plurality of images of tools, with the image being produced at a given point in time being dependent on the position and orientation of the real object.

63. The apparatus set forth in claim 55 wherein:

the parameters include a mode parameter;

the apparatus produces a plurality of images of tools, with the image being produced at a given point in time being dependent on the mode parameter.

64. The apparatus set forth in claim 55 wherein:

the apparatus produces a plurality of images of tools, with the image being produced at a given point in time being dependent on the image's position in the virtual environment.

* * * * *